United States Patent
Cullen et al.

(10) Patent No.: US 10,027,204 B2
(45) Date of Patent: Jul. 17, 2018

(54) METHOD OF CONNECTING AND DISCONNECTING POWER TO LOADS AND A SWITCHING APPARATUS EMPLOYING SAME

(71) Applicant: NEVERARC INC., Calgary (CA)

(72) Inventors: Travis Cullen, Calgary (CA); Chris Runn, Calgary (CA)

(73) Assignee: NEVERARC INC., Calgary (CA)

( * ) Notice: Subject to any disclaimer, the term of this patent is extended or adjusted under 35 U.S.C. 154(b) by 443 days.

(21) Appl. No.: 14/817,475

(22) Filed: Aug. 4, 2015

(65) Prior Publication Data

US 2016/0241114 A1 Aug. 18, 2016

Related U.S. Application Data

(60) Provisional application No. 62/117,560, filed on Feb. 18, 2015.

(51) Int. Cl.
*H02K 11/00* (2016.01)
*H02K 11/28* (2016.01)
*H05K 7/14* (2006.01)

(52) U.S. Cl.
CPC .......... *H02K 11/28* (2016.01); *H05K 7/1432* (2013.01)

(58) Field of Classification Search
CPC .............................. H02K 11/28; H05K 7/1432
USPC ......................................................... 310/68 A
See application file for complete search history.

(56) References Cited

U.S. PATENT DOCUMENTS 8,113,855 B2 * 2/2012 Green .................... H01R 13/44
439/131
8,277,237 B1 * 10/2012 Cherish .................. H01R 24/30
439/131

* cited by examiner

*Primary Examiner* — Jianchun Qin
(74) *Attorney, Agent, or Firm* — Parlee McClaws LLP (CGY); Sean Goodwin

(57) ABSTRACT

A motor control center having one or more control modules is disclosed. Each control module has a cabinet for enclosing therein a first contact set and a second contact set forming rotatable electricity conducting switches or contacts from the bus bars of the motor control center to a circuit breaker in the control module. An operation handle, extending from the cabinet, is used to operate the control module between different states. The operation handle is coupled to an operating mechanism in the cabinet. The operation handle sequentially operates the first contact set to couple to the bus and power a test circuit, the second contact set to couple the first contact set to the circuit breaker, and lastly to switch on the circuit breaker.

14 Claims, 38 Drawing Sheets

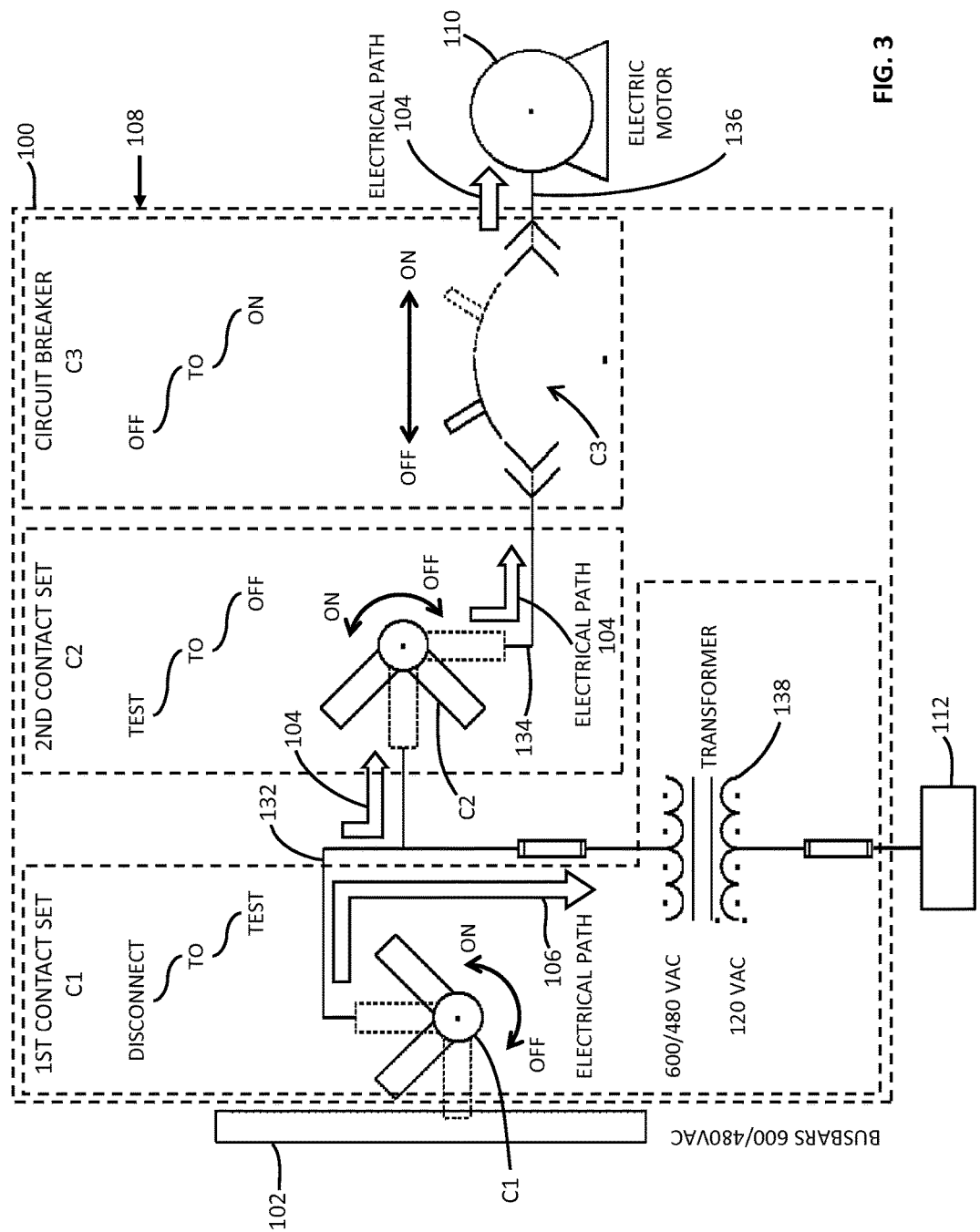

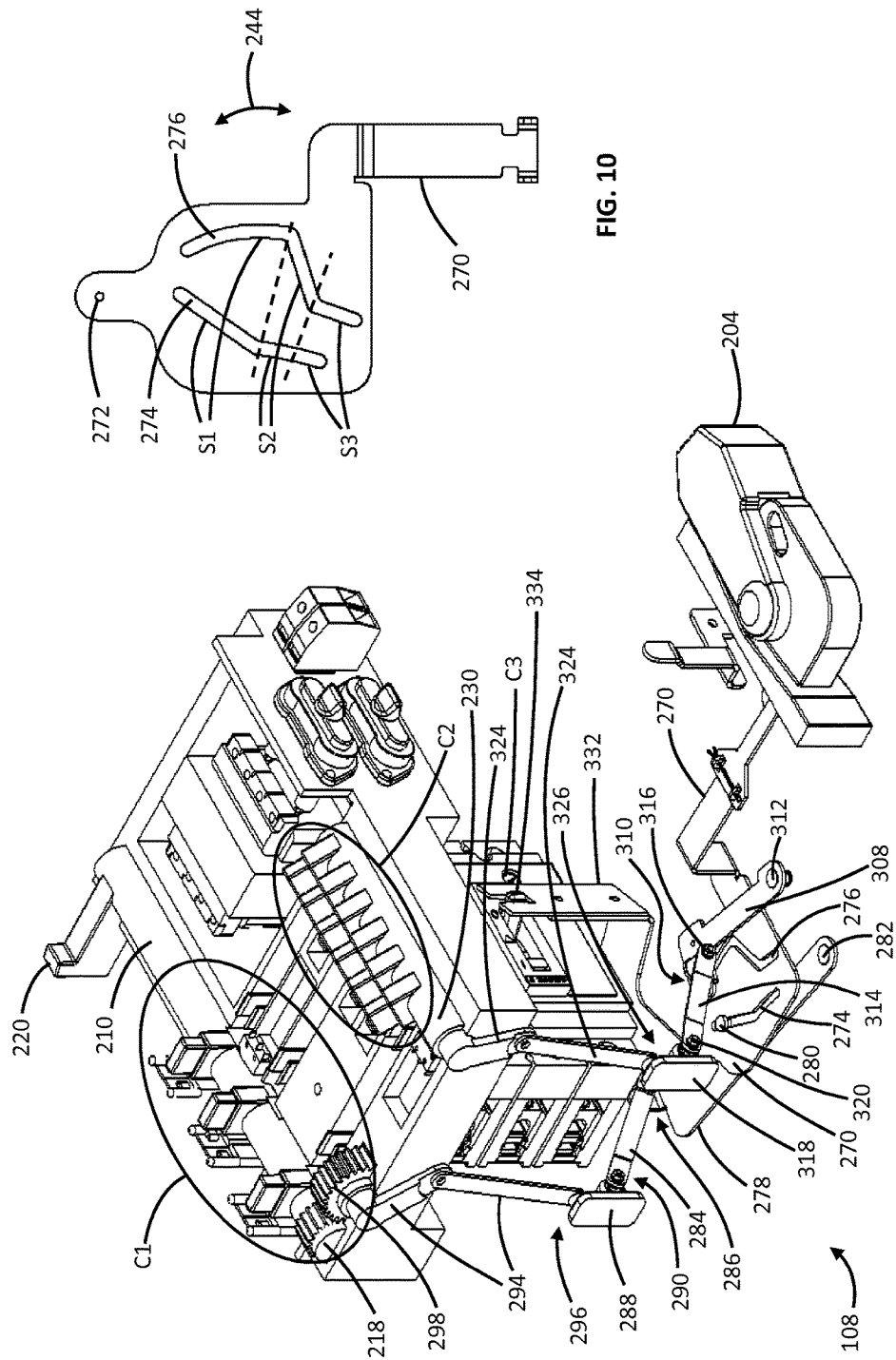

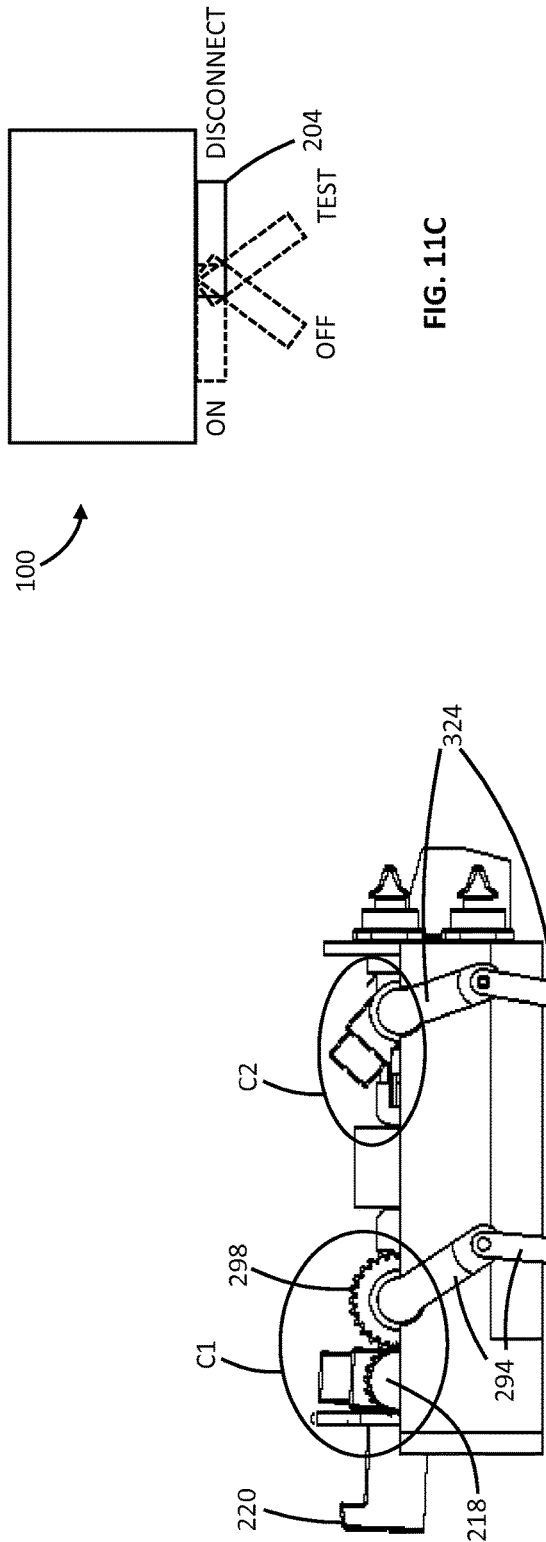
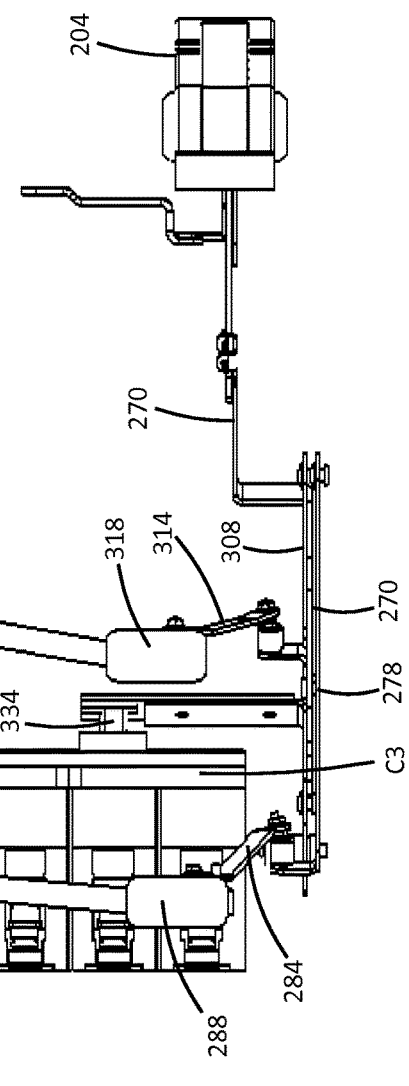
FIG. 11C
FIG. 11A

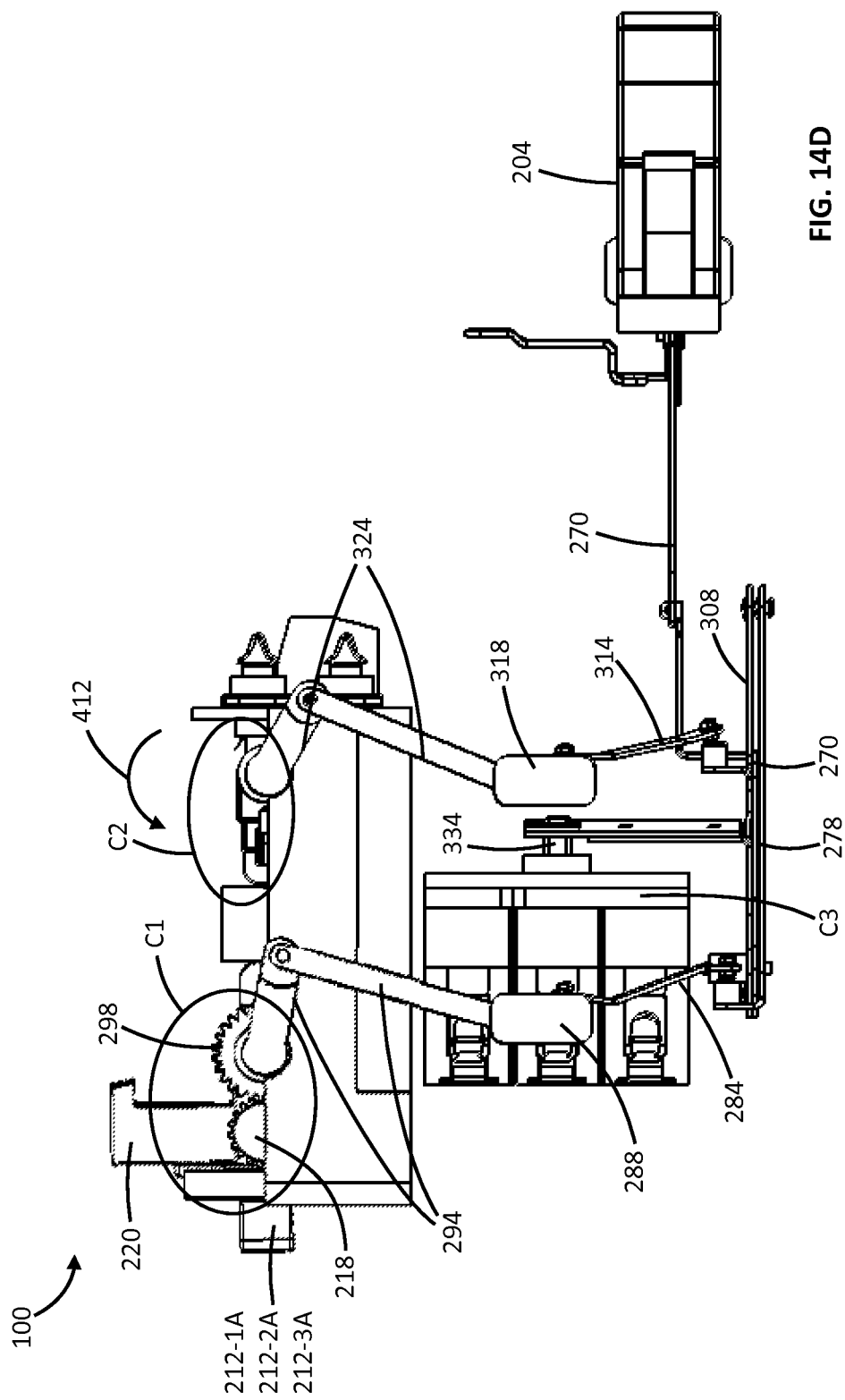

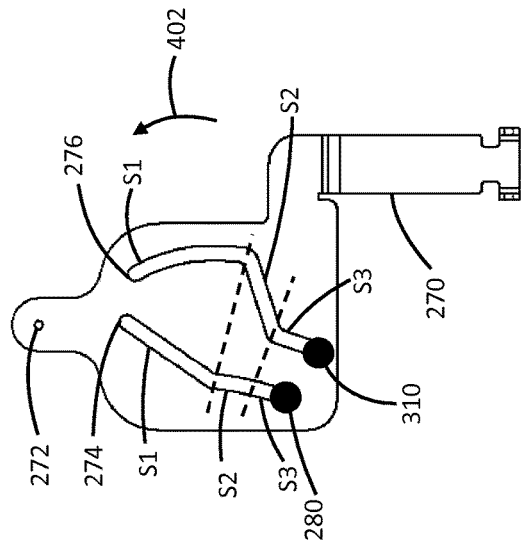
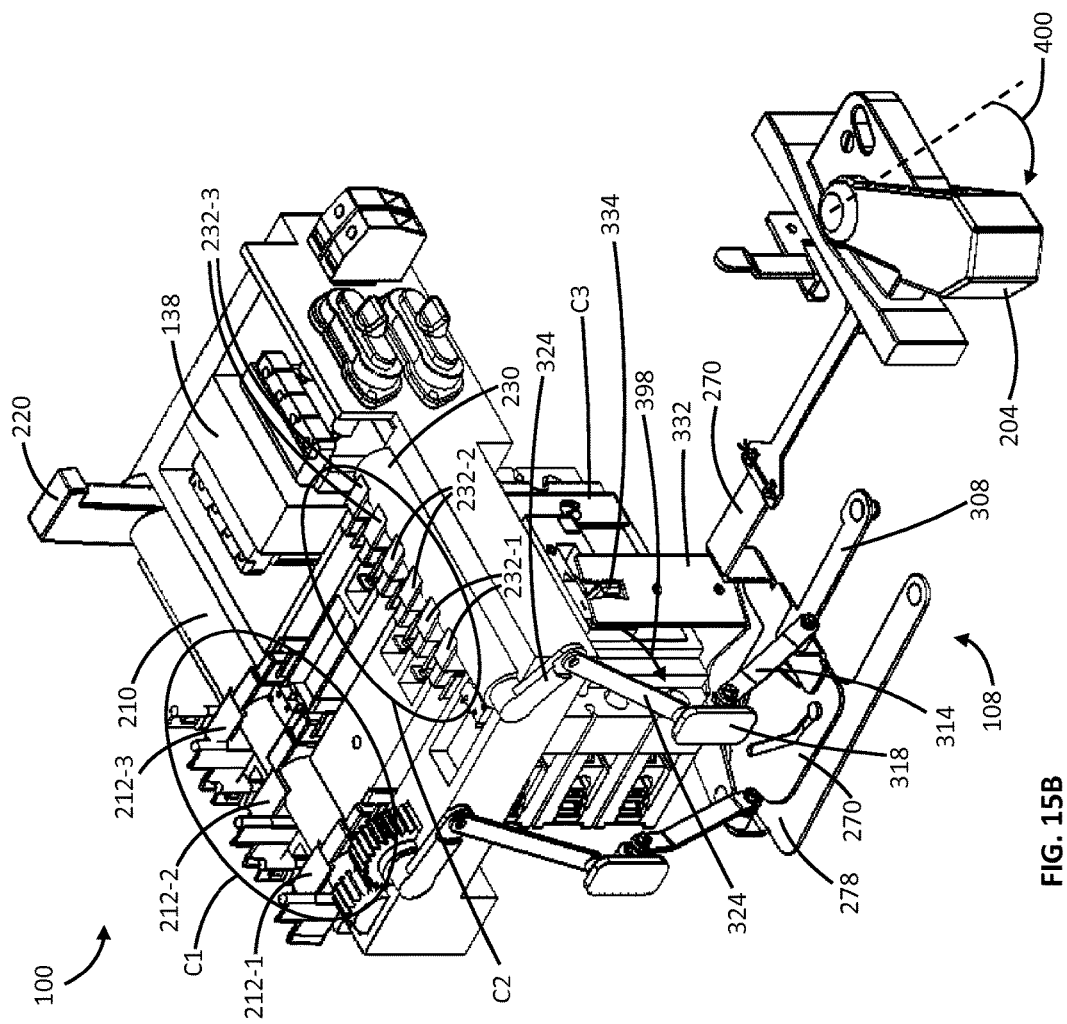
FIG. 15C
FIG. 15B

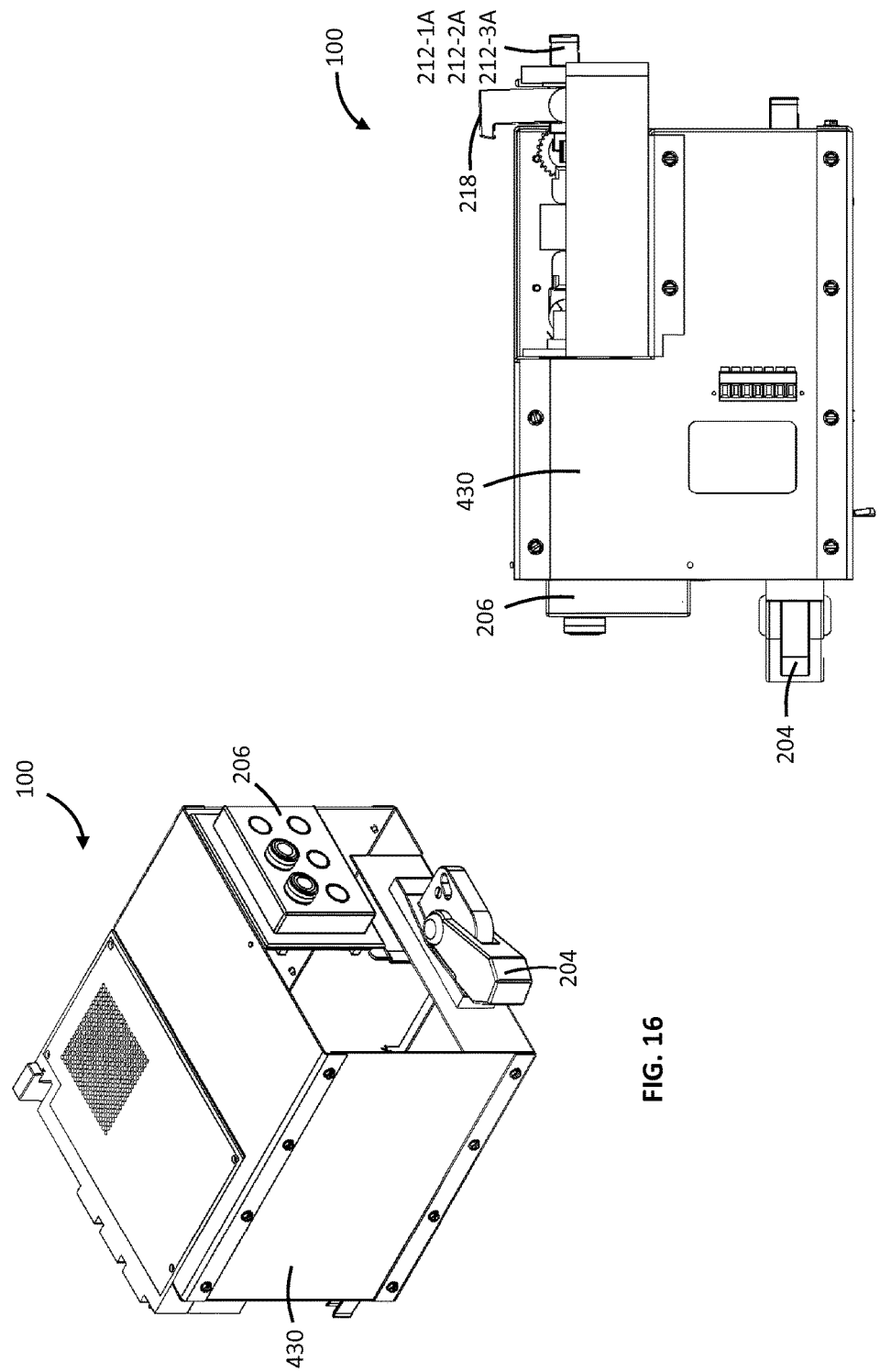

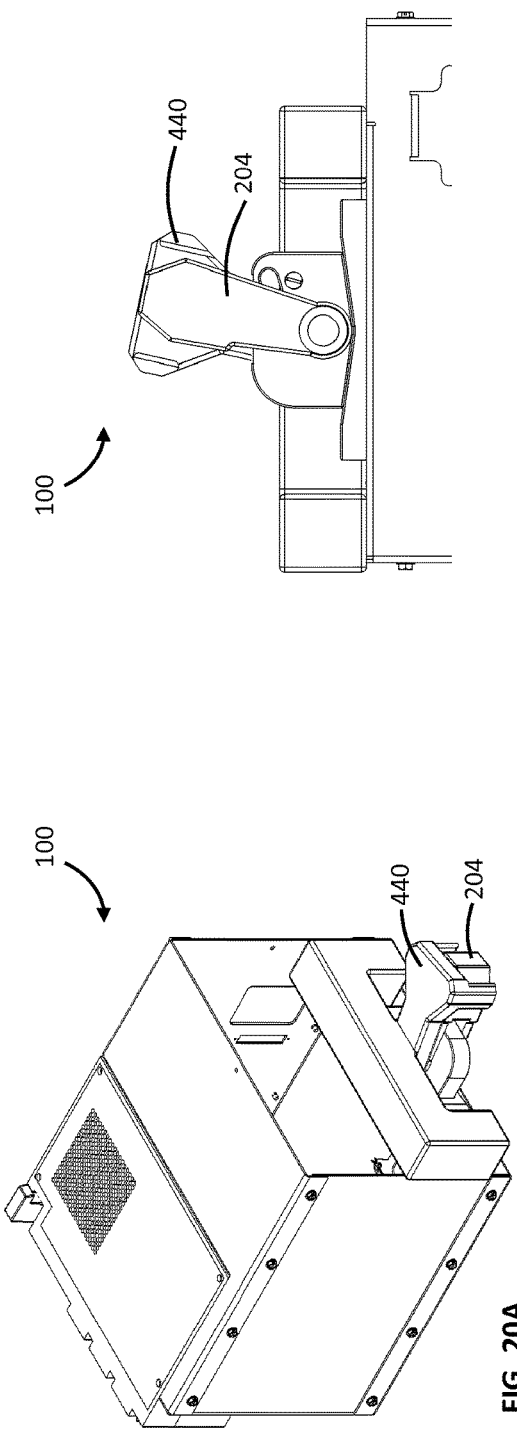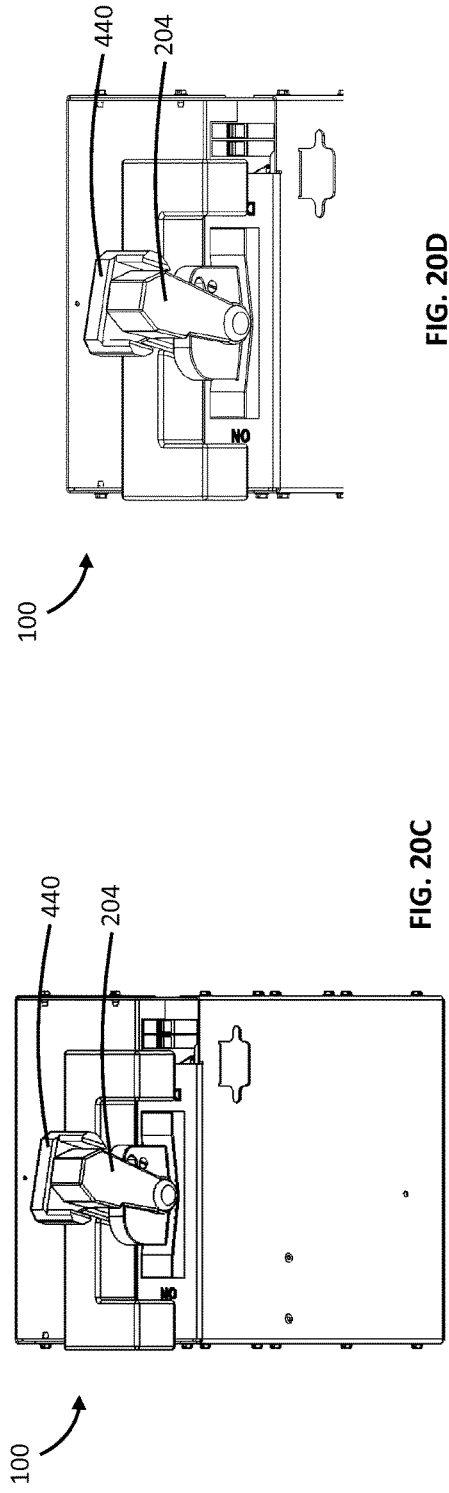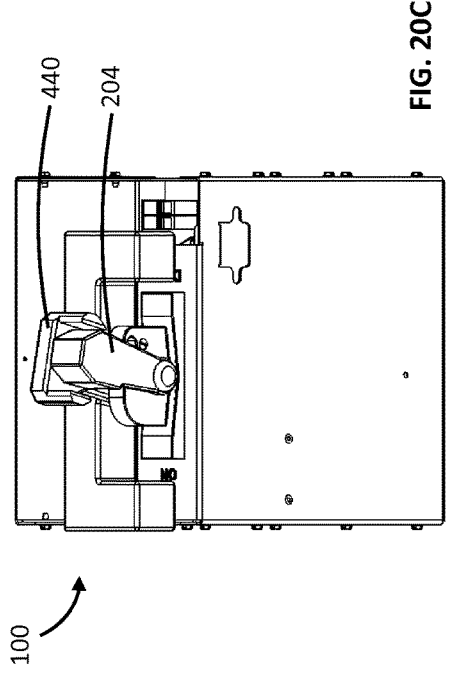

METHOD OF CONNECTING AND DISCONNECTING POWER TO LOADS AND A SWITCHING APPARATUS EMPLOYING SAME

CROSS-REFERENCE TO RELATED APPLICATIONS

This application claims the benefit of U.S. Provisional Patent Application Ser. No. 62/117,560, filed on Feb. 18, 2015, the entirety of which is incorporated herein by reference.

FIELD OF THE DISCLOSURE

The present disclosure relates generally to a switching system and method for connecting and disconnecting electrical power to loads, and more particularly, to a system and method of connecting and disconnecting electrical power to electrical motors, and a starter bucket installed in a motor control center employing same.

BACKGROUND

A motor control center is a multi-compartment steel enclosure with a common bus system to distribute electrical power to one or more individual motor controllers or starter buckets mountable within the compartments. Motor control centers are most often used in factories and industrial facilities which utilize high power electrical motors, pumps, and other loads. The individual starter buckets are commonly referred to as "buckets" and are typically constructed to be removable, pull-out units to be installed in the motor control center enclosure. For safety purpose, the motor control center may comprise a sealable door to sealably enclose the modules or buckets in the motor control center. Alternatively, the motor control center may comprise a plurality of sealable doors, each for sealably enclosing a module in the motor control center.

The modules may contain various motor control and motor protection components such as motor controllers, starters, contactor assemblies, overload relays, circuit breakers, motor circuit protectors, various disconnects, and the like, for operating high voltage motors. The modules connect to the supply power lines of the motor control center and conduct supply power to the line side of the motor control components provided therein, for operation of motors.

Typically, when installing or removing the starter buckets, the corresponding power supply lines are connected or interrupted, respectively. For example, to remove such a module, a sealable front door of the module or of the motor control center is opened and an operator manually pulls on the module to separate the line connectors, or "tabs," from the bus system, thereby disconnecting power supply. Installation of the module is accomplished in a similar manner, wherein the operator manually pushes the module into a compartment of the motor control center to engage the bucket tabs with the bus system, and thus connect the system to supply power. The line connectors or tabs may be difficult to maneuver manually when an operator is handling the entire bucket or when the tabs are not visible.

Various techniques have been evolved to improve upon the manual installation and disconnection of modules and supply power connections from live supply power lines, risers, and/or a vertical bus of a motor control center. For example, systems have employed pivotable handles inside the modules to pivot the electrical connectors away from the supply lines. However, many of these systems require that the module's door shall first be opened to manipulate the handles and line connectors.

Thus, currently available maintenance and testing methodology in respect of the starter buckets involves removal of the starter buckets, while the motor control center still has electricity running through the vertical bus bars (an energized state). For example, an operator may need to manually push a starter bucket inwardly, while the motor control center door is open, to engage the receiver clamps. The clamps are usually female connectors immovably mounted onto the back of the starter bucket that engage with the copper bus conductors, which are usually male connectors.

Such a process is dangerous procedure since the sealable door must be open, and accordingly the operator is exposed directly to electrical conducting components. If any of the electrical conducting components malfunction, an event called an arc flash can result, which can grievously injure or even kill the operator.

Further, prior art starter buckets provide only two states (on/off). When an operator needs to conduct maintenance or tests to a starter bucket, the operator has to open the motor control center's door, and conduct the maintenance or tests while the door is open. Although the motor to be controlled is turned off, the operator is exposed to the energized electrical cables within the motor control center, thereby increasing the risk of injury from an arc flash that could occur from even a simple mistake such as dropping a tool onto an energized electrical cable contact. Due to industry work practices and the design of prevalent motor control center in industry, it is not possible to simply close the door to provide the desired protection throughout maintenance or tests.

It is therefore an object to provide a novel method of supplying power to motor control components that minimizes the risk to an operator and a motor control center employing same.

SUMMARY

An object of the present disclosure is to provide a motor control center having one or more electrical control modules (also known as isolation units), to isolate operators from risk of electrical hazards, such as arc or arc flash, poisonous gas, flame and the like. If any arc flash should occur, it is isolated inside the isolation unit and is directed away from the operator by containing it behind a closed door.

Another object of the present disclosure is to provide an electrical control module having an operable knob or handle that allows a working technician to set the control module to different operating states, e.g., DISCONNECT, TEST, OFF and ON while isolating the technician from the danger as aforementioned.

Accordingly, the present disclosure describes a control module, or an isolation unit, incorporated into a cabinet. The control module includes electricity conducting paths implemented via a first contact set for releasable connection to an electrical bus, and a second contact set for separably connecting the circuit breaker in the OFF position, and lastly for toggling the circuit breaker from OFF to ON. An actuation structure is mounted in the cabinet and extends at least partly from the cabinet via an operation handle. The actuation structure, in response to an actuation or movement of the operation handle from outside a closed mechanical cabinet, imparts sequential movement to the first contact set, the second contact set and the circuit breaker.

In addition, the present disclosure also describes a motor control center comprising: a frame enclosing supply power along a vertical bus bars; and at least one control module inside a starter bucket containing motor control components adapted to be received by the frame, the control module comprising: a cabinet; at least one motor control circuit housed within the cabinet and being in electrical connection with a first contact set via a second contact set and a circuit breaker operating mechanism; an operating mechanism connected to the cabinet and extending at least partly from the cabinet with an external operation handle, said operating mechanism, in response to an actuation, imparting sequential movement to the first contact set, the second contact set and the circuit breaker operating mechanism; and the first contact set in response to the movement imparted by the operating mechanism extends through the cabinet and makes electrical contact with the supply power bus bars.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

According to one aspect of this disclosure, there is provided an apparatus for selectively connecting a power source to a load. The apparatus comprises: a cabinet; a first set of switches enclosed in the cabinet synchronously switchable between an OPEN state and a CLOSED state, each switch of the first set of switches comprising a first prong, wherein when the first set of switches are at the CLOSED state, each first prong extends out of the cabinet for electrically connecting to the power source, and when the first set of switches are at the OPEN state, each first prong is fully retracted into the cabinet; a third set of switches enclosed in the cabinet synchronously switchable between an OPEN state and a CLOSED state, said third set of switches, when at the CLOSED state, electrically connecting the first set of switches to the load; and an actuation structure enclosed in the cabinet operably coupled to the first and third sets of switches for switching the first and third sets of switches to transit the apparatus to one of a predefined set of states in response to a user command received from outside of the cabinet; wherein the third set of switches is actuatable by the actuation structure to switch to the CLOSED state only when the first set of switches are in the CLOSED state.

In one embodiment, the apparatus further comprises: an operation handle; wherein the actuation structure is coupled between the operation handle and the first and third sets of switches, wherein the operation handle is extendable outside the cabinet, and is operable by a user outside the cabinet for initiating a command to transit the apparatus to one of the predefined set of states.

In one embodiment, the third set of switches, when at the CLOSED state, electrically connect the first set of switches to the load via a second set of switches enclosed in the cabinet, wherein the second set of switches are electrically connectable between the first and third sets of switches, and are switchable between an OPEN state and a CLOSED state under the actuation of the actuation structure. The second set of switches is actuatable by the actuation structure to switch to the CLOSED state only when the first set of switches are in the CLOSED state, and the third set of switches is actuatable by the actuation structure to switch to the CLOSED state only when the first and second sets of switches are in the CLOSED state.

In one embodiment, the predefined set of states comprises: a DISCONNECT state, in which the first, second and third sets of switches are in the OPEN state; a TEST state, in which the first set of switches are in the CLOSED state, and the second and third sets of switches are in the OPEN state; an OFF state, in which the first and second sets of switches are in the CLOSED state, and the third set of switches are all in the OPEN state; and an ON state, in which the first, second and third sets of switches are all the CLOSED state.

In one embodiment, the first set of switches, when in the CLOSED state also connects the power source to a transformer for supplying transformed electrical power to a testing device.

In one embodiment, the first set of switches further comprises a first rotatable cylindrical member, the first prongs of the first set of switches being mounted on the first rotatable cylindrical member and rotatable therewith, the first rotatable cylindrical member coupled to the actuation structure for being actuated to switch the first set of switches between the OPEN and CLOSED states.

In one embodiment, each switch of the first set of switches further comprises a second prong electrically coupled to the first prong thereof; said second prongs being mounted on the first rotatable cylindrical member and rotatable therewith; wherein when the first set of switches are in the CLOSED states, each of the second prongs thereof is electrically connected to a respective first electrical terminal in the cabinet, each of said first electrical terminals connectable to a respective switch of the second set of switches.

In one embodiment, the second set of switches further comprises a second rotatable cylindrical member, the second set of switches being mounted on the second rotatable cylindrical member and rotatable therewith, the second rotatable cylindrical member coupled to the actuation structure for being actuated to switch the second set of switches between the OPEN and CLOSED states.

In one embodiment, each switch of the second set of switches comprises a third prong mounted on the second rotatable cylindrical member and rotatable therewith; wherein when the second set of switches are in the CLOSED states, each of the third prongs thereof is electrically connected to a respective one of the first electrical terminals in the cabinet.

In one embodiment, each switch of the second set of switches further comprises a fourth prong mounted on the second rotatable cylindrical member and rotatable therewith; wherein when the second set of switches are in the CLOSED states, each of the fourth prongs thereof is electrically connected to a respective switch of the third set of switches.

In one embodiment, the actuation structure comprises a shaft movably coupled to the operation handle, the shaft comprising a first and a second J-slots for actuating the first and second rotatable cylindrical members, respectively.

In one embodiment, each of the first and second J-slots comprises a first, a second and a third sections, the first rotatable cylindrical member only being actuated by the first section of the first J-slot, and the second rotatable cylindrical member only being actuated by the second section of the second J-slot.

In one embodiment, the power source comprises a set of bus bars for passing electrical power to the load.

In one embodiment, the power source is a three phase power source and comprises three bus bars, and each of the first, second and third sets of switches comprise three switches.

In one embodiment, the power source is a single phase power source and comprises only one bus bar, and each of the first, second and third sets of switches comprise only one switch.

According to another aspect of this disclosure, there is provided a method for connecting a power source to a load. The method comprises: providing a cabinet; and in response to a user command received from outside of the cabinet, extending a set of first prongs out of the cabinet and electrically connecting the power source to a first circuit in the cabinet through the set of first prongs; and after extending the set of first prongs out of the cabinet and electrically connecting to the power source, connecting the first circuit to the load.

In one embodiment, said connecting the first circuit to the load comprises: connecting, in the cabinet, the first circuit to a second circuit in the cabinet; and after connecting the first circuit to the second circuit, connecting the second circuit to the load.

In one embodiment, the method further comprises: connecting the first circuit to a testing device.

In one embodiment, said connecting the first circuit to a testing device comprises: connecting the first circuit to a testing device through a transformer.

According to another aspect of this disclosure, there is provided a motor control center for connecting a power source to a load, said motor control center having one or more compartments, at least one of the one or more compartments receiving therein an above described apparatus.

In one embodiment, each of the one or more compartments comprises a door for isolating the apparatus from outside of the compartment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein some panels of a cabinet may be omitted for illustrating the internal thereof, and some components may be omitted for ease of illustrating the structure and/or operation of other components, and wherein:

FIG. 3 shows an electrical-mechanical illustration of the operation of the control module of FIG. 1A;

FIGS. 9A and 9B are left-front and left-back isometric views, respectively, of the control module of FIG. 1A from different viewing angles, showing an actuation structure thereof;

FIG. 10 is a top view of a master actuation shaft of the actuation structure of FIG. 9A;

FIG. 11A is a left-side view of the control module of FIG. 1A when the control module is in a DISCONNECT state;

FIG. 11C is a simplified top view of the control module of FIG. 1A showing the positions of the operation handle thereof for transiting the control module to different states;

FIG. 14D is a left-side view of the control module of FIG. 1A when the control module is in the OFF state;

FIGS. 15A, 15B, 15E and 15F are left-front, left-front, right-back and left-back isometric views, respectively, of the control module of FIG. 1A from different viewing angles when the control module is in an ON state;

FIG. 15C is a top view of the master actuation shaft of the actuation structure of FIG. 9A when the control module is in the ON state;

FIG. 16 is a left-front, isometric view of the control module of FIG. 1A with a side covering;

FIG. 17 illustrates the opposite, right-side view representation of the control module when compared with the representation of FIG. 16 and accordingly displays another side covering that acts as a part of the cabinet of the control module of FIG. 1A;

FIGS. 20A to 20D show left-front isometric view, an enlarged portion of a top view, a bottom view and an enlarged portion of the bottom view, respectively, of the control module of FIG. 1A having a remotely actuatable operation handle, according to an alternative embodiment.

DETAILED DESCRIPTION

The present subject matter overcomes the problems in the existing motor control center, such as the problems described in the Background section, by using one or more control modules with isolation functionality within respective starter buckets that protect operators including while they are conducting maintenance. For example, the control modules described herein isolate any arc flash danger inside the module, and blocks it from reaching the operator, therefore greatly reducing risk of injury. In addition, the control module described herein is designed with compact, rotatable switches or tabs for allowing the operator to move an operator knob or handle on the wall of the module to choose from different isolation states, e.g., ON, OFF, TEST and DISCONNECT, while the operator operates behind a metal barrier or a closed motor control center door.

Further, the isolation unit disclosed herein functions to isolate arc flash danger and direct it away from the operator by allowing the door of the motor control center to remain closed prior to the control module connecting to the main power supply within the motor control center. This is facilitated with the operator putting the operation handle to the DISCONNECT state. The tabs or switches then sequentially interact with the power supply lines, based upon the operation handle's position.

Overall, the benefits of the present subject matter are achieved by using compact switches located in the module that are capable of rotating to various positions compatible with and in combination with power supply lines.

Figure 1B:
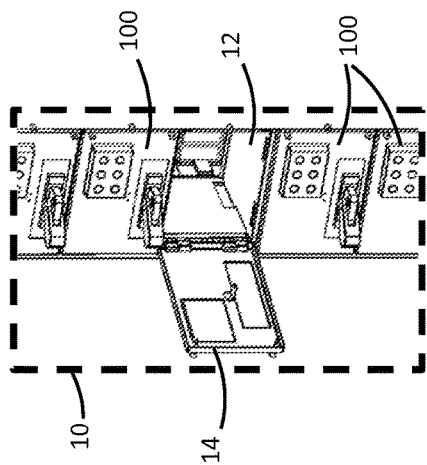
FIGS. 1A and 1B show a portion of a motor control center having a plurality of control modules.
Figure 1A:
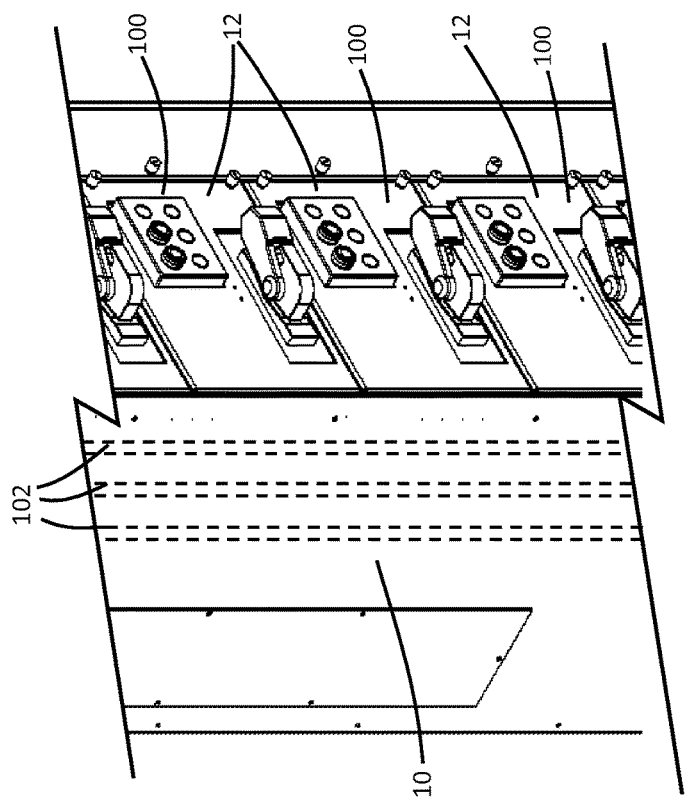
Figure 5:
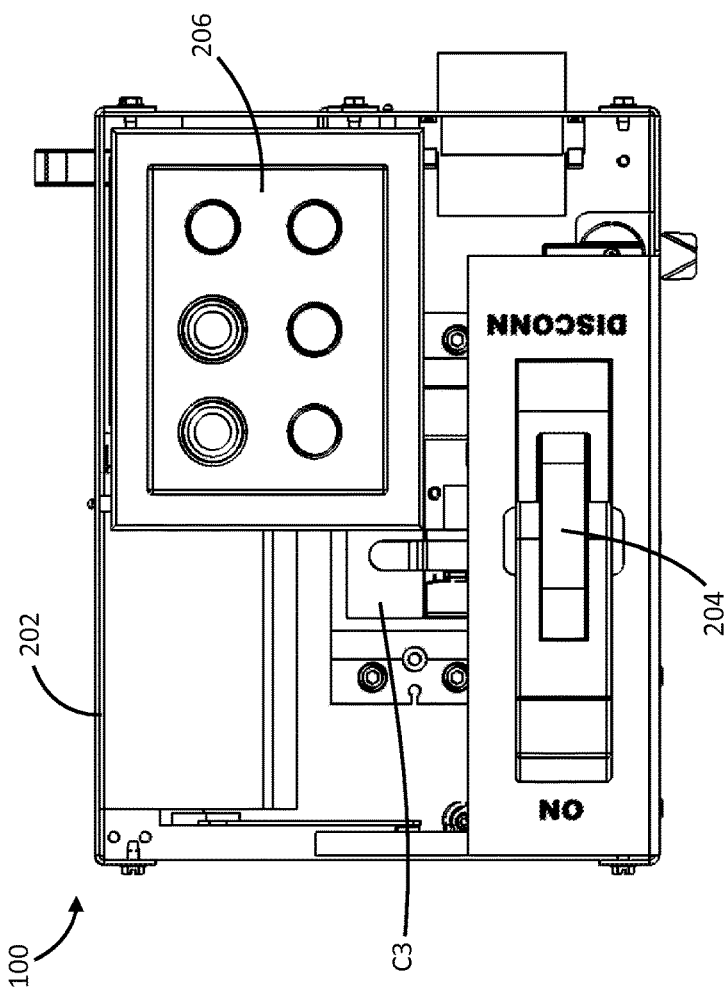
FIG. 5 is a front view of the control module of FIG. 1A.

Now turning to FIGS. 1A and 1B, a portion of a motor control center 10 is shown. In this embodiment, the motor control center 10 is a steel enclosure having a plurality of compartments 12 arranged in a column. Each compartment 12 comprises receives therein a control module or starter bucket 100, which is also known as an isolation unit. Each compartment 12 also comprises a steel door 14, which, when closed, isolates operators from any hazards that may occur in the compartment 12. Although located within and not fully visible in this view, the motor control center 10 also comprises a bus system 102 for distributing electrical power from a power source (not shown) to various loads (not shown) via the control modules 100.

Figure 2:
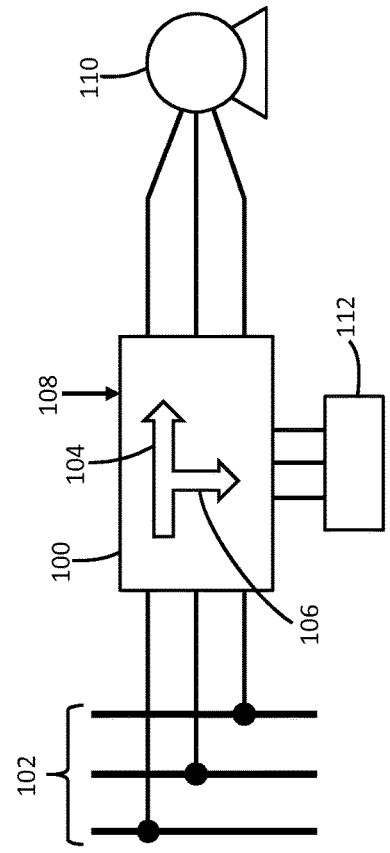
FIG. 2 shows a diagram of supplying electrical power to a load through a control module of FIG. 1A.

Also referring to FIG. 2, in this embodiment, the bus system 102 comprises three electrically conductive bus-bars for distributing three-phase alternating current (AC) power. Each control module 100 establishes a three-phase electrical power-supply path 104 from the bus-bar 102 to a load 110. It also establishes a three-phase electrical testing path 106 from the bus-bar 102 to a testing device. As will be described in more detail later, the establishment of the power-supply and testing paths 104 and 106 are controlled by an actuation structure 108 under the command of an operator.

FIG. 3 is a simplified electrical-mechanical diagram showing one phase of the control module 100. Other two phases are similar to FIG. 3. In this embodiment the bus-bar provides a 600/480 VAC electrical power. As shown, the control module 100 comprises a first contact set C1, a second contact set C2 and a three-phase circuit breaker C3. The first contact set C1 comprises three contacts respectively corresponding to the three phases, and synchronously switchable between a CLOSED state and an OPEN state. Similarly, the second contact set C2 also comprises three contacts respectively corresponding to the three phases, and synchronously switchable between a CLOSED state and an OPEN state. The circuit breaker C3 is a three-phase breaker, and may be switched between switchable between a CLOSED state and an OPEN state. In FIG. 3, the CLOSED state of C1, C2 or C3 is represented using dashed lines, and the OPEN state thereof is represented using solid lines. Such contact sets can physically comprise redundant contacts for reliability.

When the first connect set C1 is switched to the CLOSED state, it connects the bus-bar 102 to a first intermediate circuit 132, establishing the testing path 106 and forming a first portion of the power-supply path 104. When the first connect C1 is switched to the OPEN state, both the testing path and the power-supply path are disconnected.

When the second contact C2 is switched to the CLOSED state, it connects the first intermediate circuit 132 to a second intermediate circuit 134 to form a second portion of the power-supply path 104. When the second contact C2 is switched to the OPEN state, it disconnects the first and second intermediate circuits 132 and 134.

When the circuit breaker C3 is in the CLOSED state, it connects the second intermediate circuit 134 to the load 110, via a third intermediate circuit 136. When the circuit breaker C3 is in the OPEN state, it disconnects the second intermediate circuit 134 from the load when in the OPEN state. When C1, C2 and C3 are all in the CLOSED state, the power-supply path is established from the bus-bar 102 to the load 110.

Figure 4:
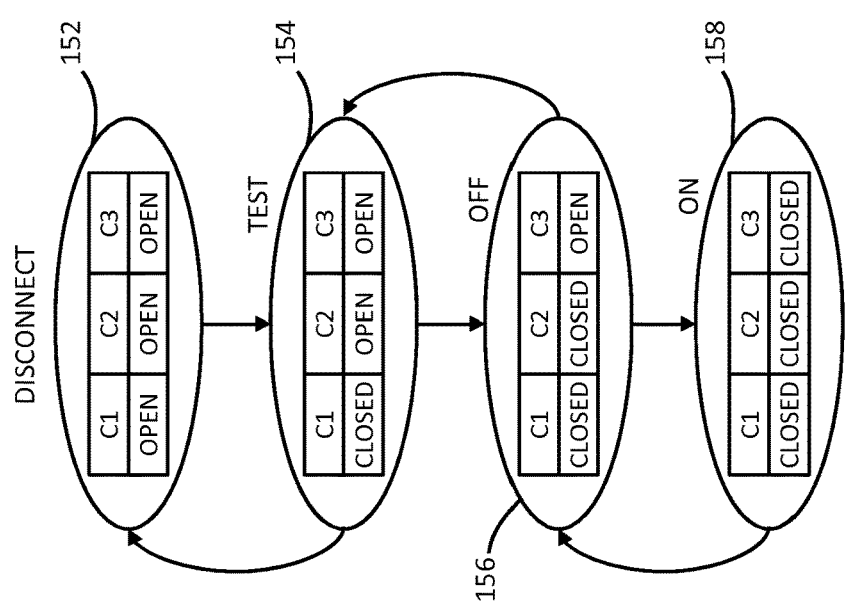
FIG. 4 is a state diagram showing state transition of the control module of FIG. 1A.
Figure 6:
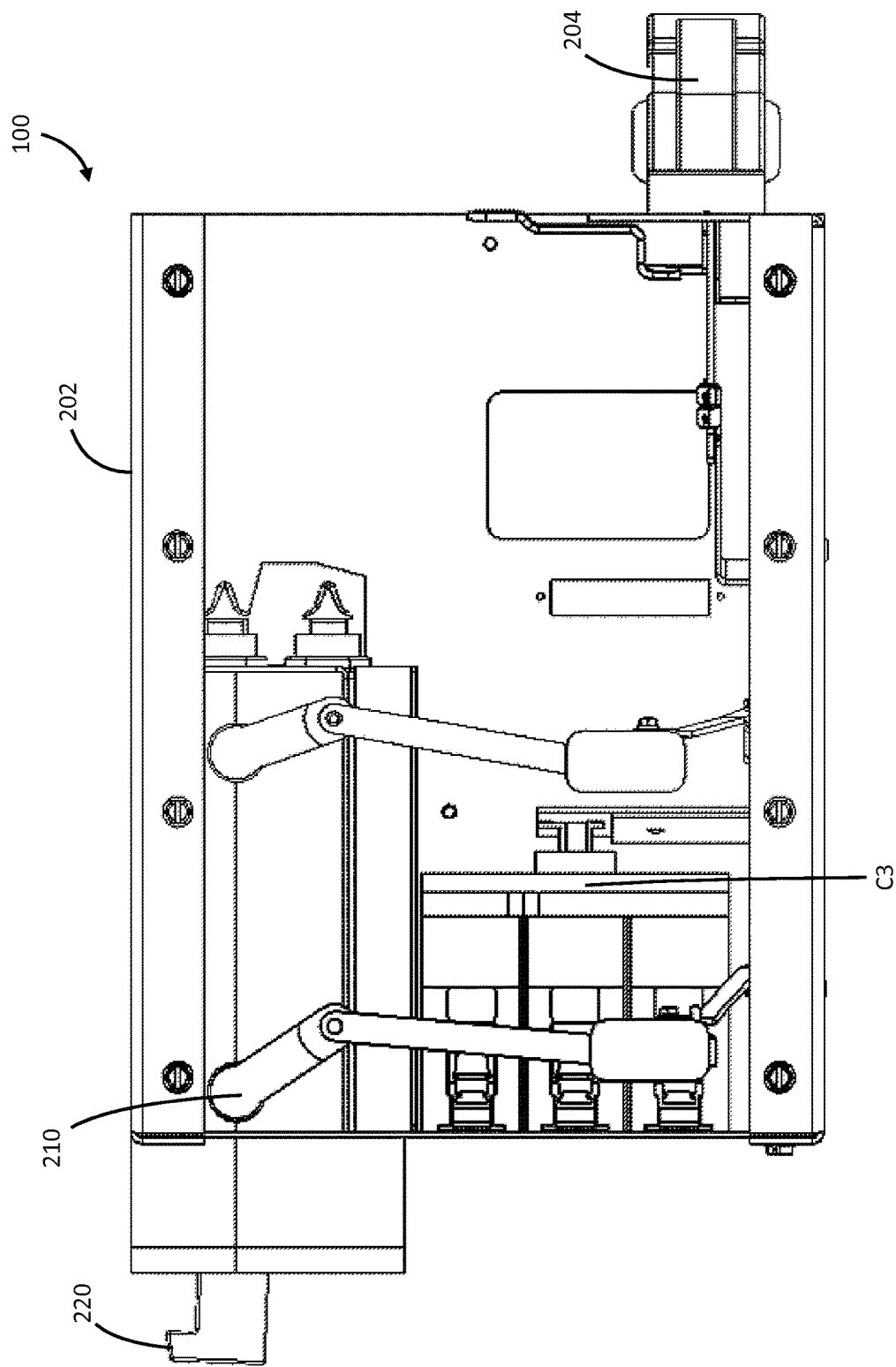
FIG. 6 is a left-side view of the control module of FIG. 1A.
Figure 7A:
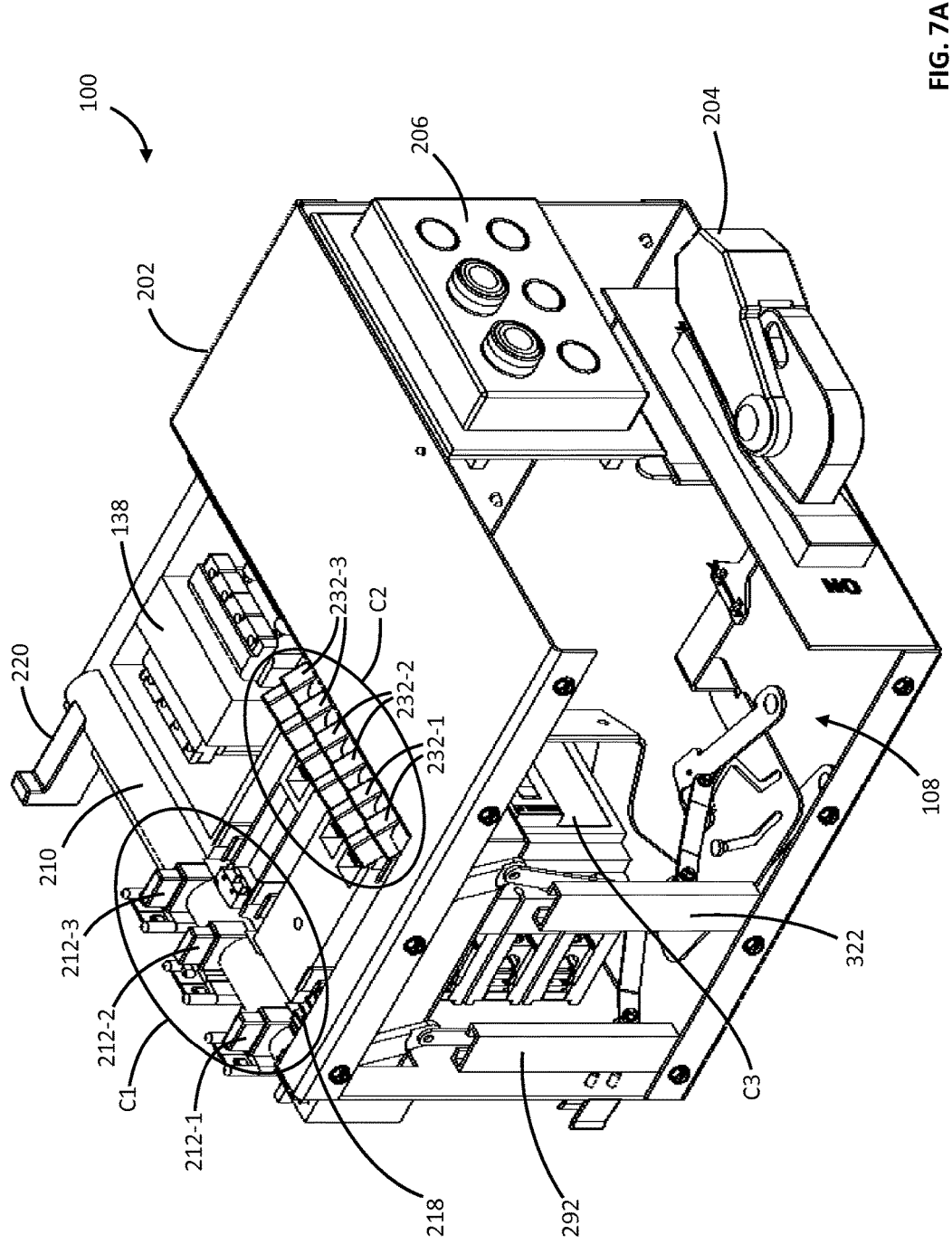
FIGS. 7A to 7C are left-front, left-front and right-front isometric views, respectively, of the control module of FIG. 1A from different viewing angles, wherein the control module in FIG. 7A is in a DISCONNECT state and in FIGS. 7B and 7C is in an ON state.
Figure 7B:
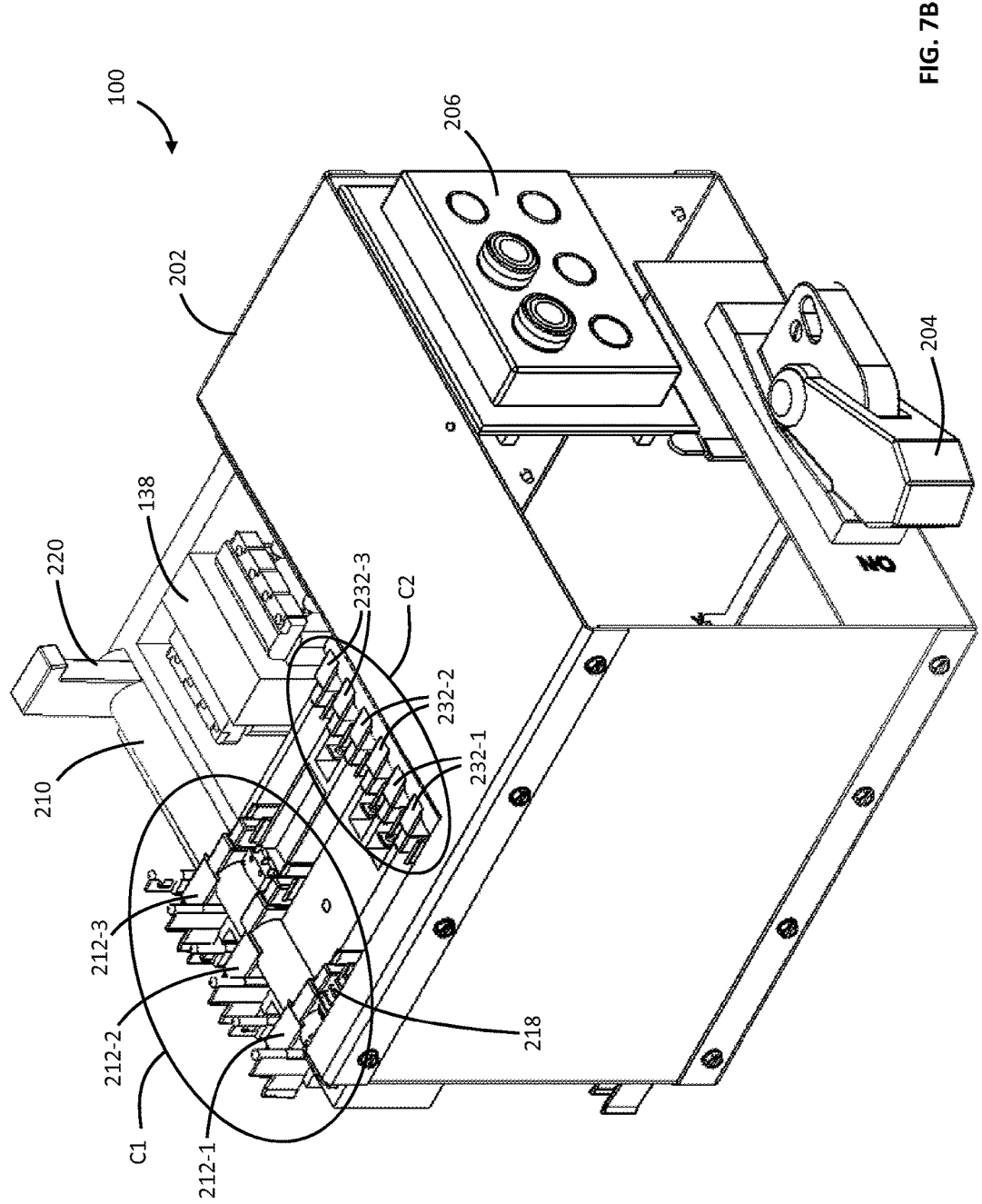
Figure 7C:
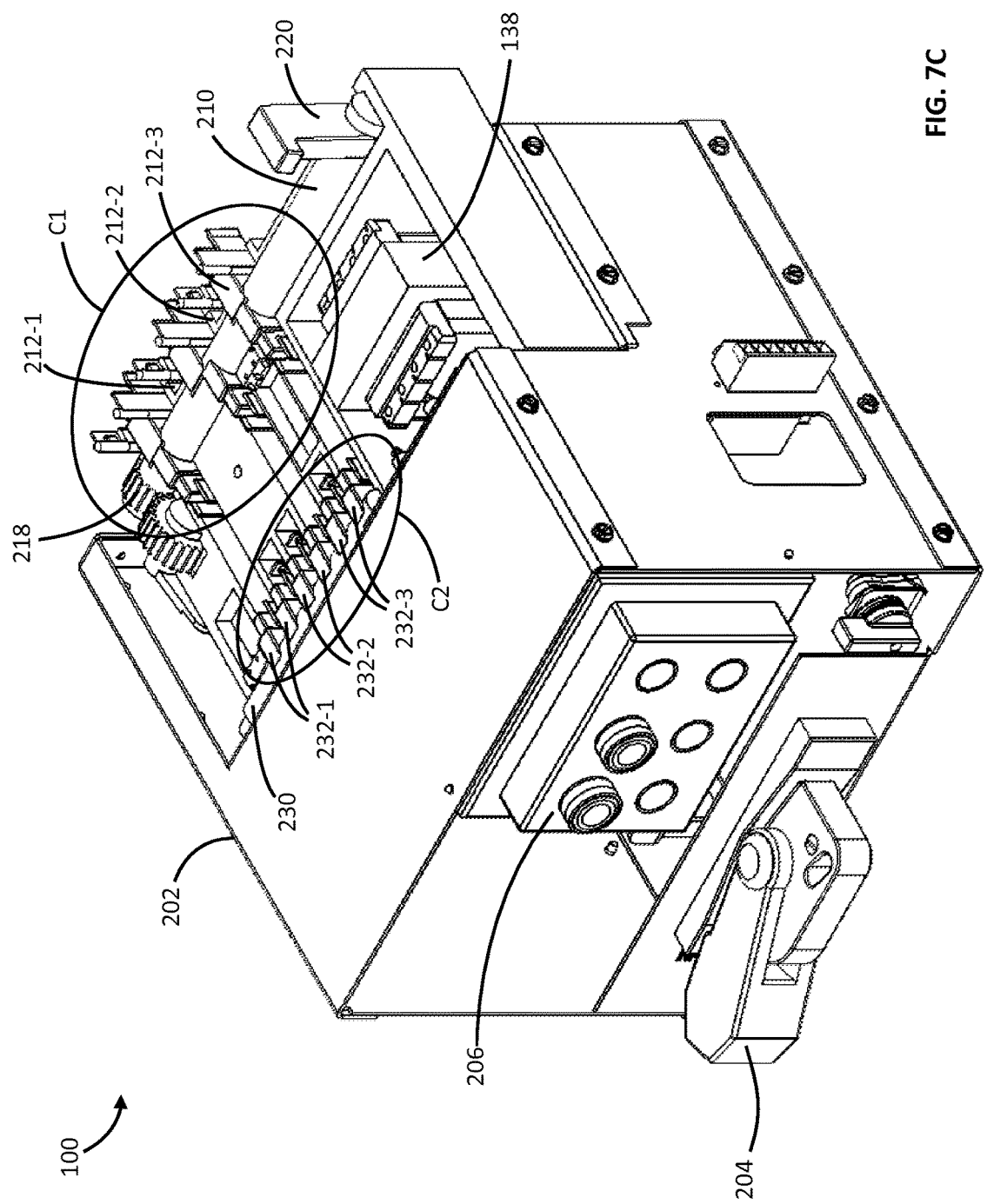

Controlled by the actuation structure 108, C1, C2 and C3 are switchable between their respective CLOSED and OPEN states in accordance with a predefined state transition rule, which is illustrated by the state diagram of the control module 100 shown in FIG. 4. As shown, the control module 100 is in a DISCONNECT state 152 when C1, C2 and C3 are all in their respective OPEN state. When C1 is switched to its CLOSED state, the control module 100 transits from the DISCONNECT state 152 to a TEST state 154. Referring again to FIG. 3, the testing path 106 is established. The power supplied from the 600/480 VAC bus-bar 102 is fed to a transformer 138, which converts the 600/480 VAC electrical power to a lower voltage of 120 VAC for supplying a voltage-lowered power to the testing device 112.

Referring back to FIG. 4, in the TEST state 154, the control module 100 may transit back to the DISCONNECT state 152 if C1 is switched to its OPEN state, and may transit to an OFF state 156 if C2 is switched to its CLOSED state.

In the OFF state 156, the control module 100 may transit back to the TEST state 154 if C2 is switched to its OPEN state, and may transit to an ON state 158 if C3 is switched to its CLOSED state.

In the ON state 158, the control module 100 may transit back to the OFF state 156 if C3 is switched to its OPEN state.

In this embodiment, other states of the control module 100 are not allowed, and the switching of C1, C2 and C3 has to follow the transition rule described in the state diagram of FIG. 4. For example, C2 is switchable from its OPEN state to its CLOSED state only when C1 is in its CLOSED state. C3 is switchable from its OPEN state to its CLOSED state only when both C1 and C2 are in their CLOSED state.

Implementation

FIGS. 5 to 7C show the structure of a control module 100, according to one embodiment. As shown, the control module 100 comprises a metal housing (so called "bucket") forming a cabinet 202. On the front wall of the cabinet 202, the control module 100 comprises an operation handle 204 or a control knob for switching the control module to different operation states, and an illumination display 206 for indicating the states, e.g., ON or DISCONNECT, of the control module 100.

In the cabinet 202, the control module comprises a three-phase first contact set C1 having three rotatable, electrically conductive, first contacts 212-1, 212-2 and 212-3, and a three-phase second contact set C2 having three rotatable, electrically conductive, second contacts 232-1, 232-2 and 232-3, and a three-phase circuit breaker C3.

In this embodiment, the first contact set C1, also called exterior switches, comprises a first cylindrical member 210 installed at the rear of the cabinet 202, rotatable about a longitudinal axis thereof. The first cylindrical member 210 receives thereon the three rotatable first contacts 212-1, 212-2 and 212-3, and comprises, at one end thereof, a meshed gear 218 coaxial with the axis of the first cylindrical member 210 and forming part of the actuation structure 108 for synchronously rotating the three contacts 212-1, 212-2 and 212-3 to switch the first contact set C1 to the OPEN or CLOSED position. The cylindrical member 210 also comprises, at the other end thereof, a locking mechanism 220 in the form of a hook for securing the control module 100 into the compartment 100. The cylindrical member 210 is electrically insulated from any electrical path of the control module 100. The three rotatable contacts 212-1, 212-2 and 212-3 are insulated from each other and from the cylindrical member 210.

Figure 8A:
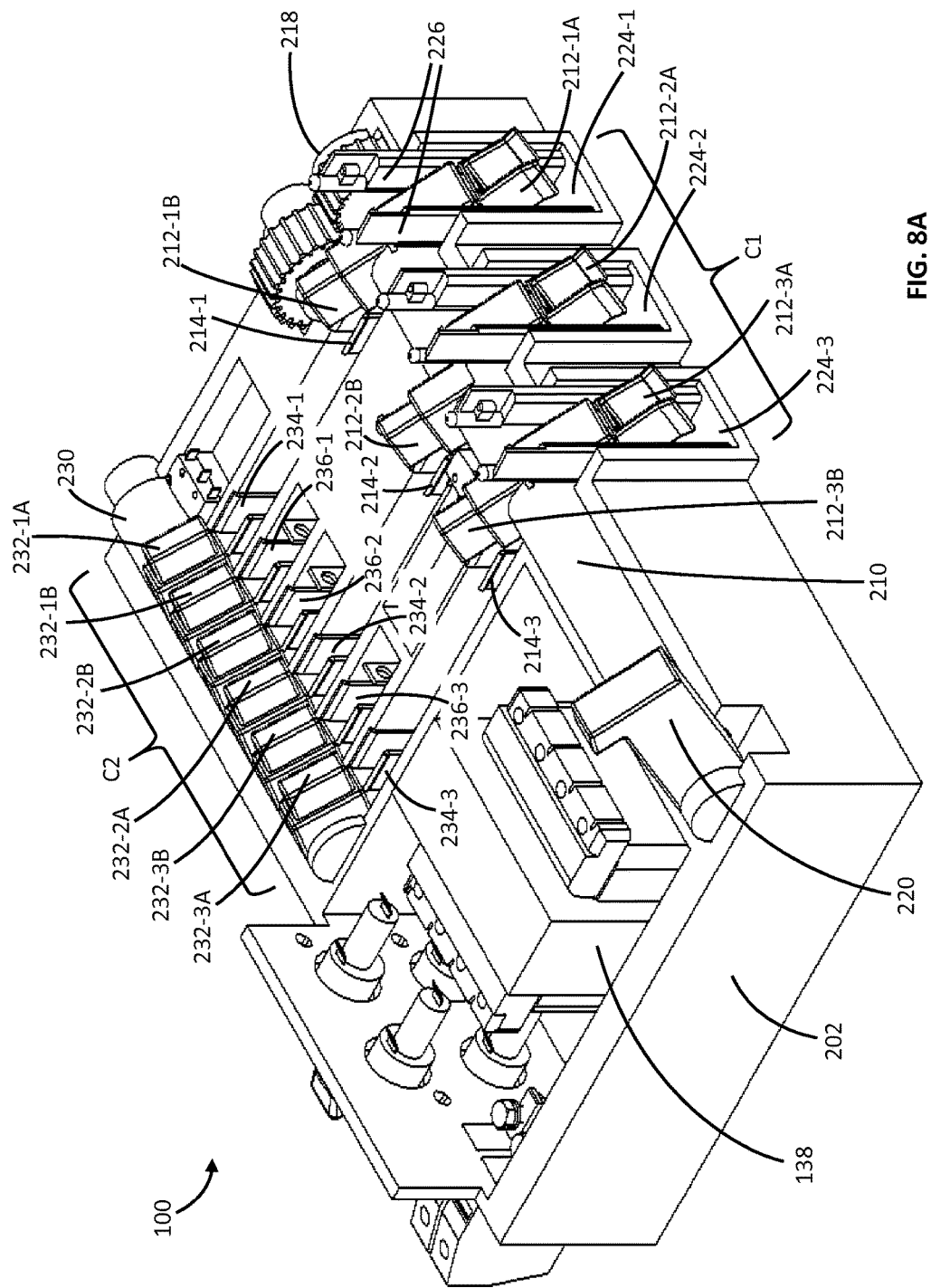
FIGS. 8A and 8B are right-back and left-back isometric views, respectively, of the control module of FIG. 1A, showing a first and a second contact sets thereof.
Figure 8B:
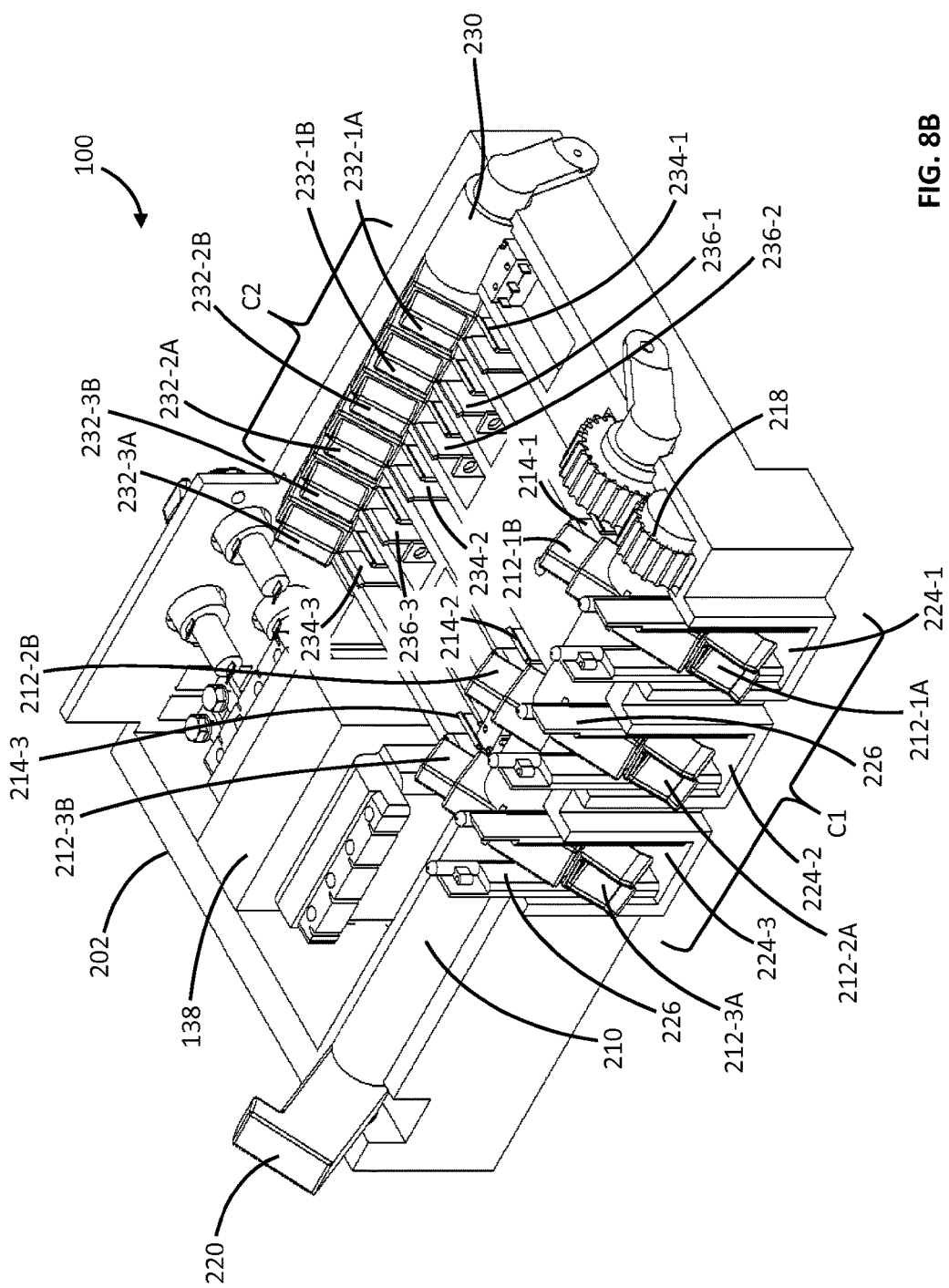

Also shown in FIGS. 8A and 8B, the rear wall of the cabinet 202 comprises three rear openings 224-1, 224-2 and 224-3, each located at a position corresponding to a respective first contact 212-1, 212-2 or 212-3. Each rear opening 224-1, 224-2, 224-3 comprises a shutter 226 in the form of a pair of swing doors, which are automatically closed, e.g., by a spring (not shown) when C1 is at the OPEN position, and may be pushed by the corresponding first contact 212-1, 212-2, 212-3 to swing outwardly and open when C1 is switching to the CLOSED position (described later). Each first contact 212-1, 212-2, 212-3, respectively, comprises an external voltage tab or prong 212-1A, 212-2A, 212-3A rotatable to the outside of the cabinet 202, and an internal voltage tab or prong 212-1B, 212-2B, 212-3B rotatable inside the cabinet 202 and electrically coupled to the external voltage prong 212A.

In the cabinet 202, the control module 100 also comprise a set of three electrical terminals 214-1, 214-2 and 214-3 (collectively denoted as 214), each located at a suitable position for connecting to a respective internal voltage prong 212-1B, 212-2B, 212-3B when the first contact set C1 is at the CLOSED position.

The second contact set C2, also called interior switches, comprises a second cylindrical member 230 installed at the front side of the cabinet 202 substantially parallel to the first cylindrical member 210, and rotatable about a longitudinal axis thereof. The second cylindrical member 230 receives thereon the three rotatable second contacts 232-1, 232-2 and 232-3, and is coupled to the actuation structure 108 at one end thereof for synchronously rotating the three contacts 232-1, 232-2 and 232-3 to switch the second contact set C2 to the OPEN or CLOSED position. The second cylindrical member 230 is electrically insulated from any electrical path of the control module 100. The three rotatable contacts 232-1, 232-2 and 232-3 are insulated from each other and from the second cylindrical member 230.

In this embodiment, each second contact 232-1, 232-2, 232-3 comprises a voltage receiving tab or prong 232-1A, 232-2A, 232-3A, and a voltage passing tab or prong 232-1B, 232-2B, 232-3B. Correspondingly, the cabinet 202 comprises a set of three electrical terminals 234-1, 234-2 and 234-3 for connecting to the respective receiving prongs 232-1A, 232-2A and 232-3A, and a set of three electrical terminals 236-1, 236-2 and 236-3 for connecting to the respective passing prongs 232-1B, 232-2B and 232-3B, when the second contact set C2 is at the CLOSED position (described later).

The electrical terminals 234-1, 234-2 and 234-3 are electrically coupled to the electrical terminals 214-1, 214-2 and 214-3, respectively, forming a portion of the first intermediate circuit 132. The electrical terminals 234-1, 234-2 and 234-3 are also electrically coupled to a control transformer 138 in the cabinet 202, forming another portion of the first intermediate circuit 132. Of course, those skilled in the art appreciate that the first intermediate circuit 132 may further comprise other circuits connected to the electrical terminals 214-1, 214-2 and 214-3.

The electrical terminals 236-1, 236-2 and 236-3 are electrically coupled to the three-phase circuit breaker C3 (not shown). The electrical terminals 236-1, 236-2 and 236-3, as well as the wiring connecting therefrom to the circuit breaker C3 form at least a portion of the second intermediate circuit 134. Of course, those skilled in the art appreciate that the second intermediate circuit 134 may further comprise other circuits connected to the electrical terminals 236-1, 236-2 and 236-3.

The circuit breaker C3 is electrically connectable to one or more loads via necessary circuits (i.e., the third intermediate circuit 136) for outputting electrical power to the one or more loads.

As described above, the first contact set C1 is disposed on a first rotatable cylindrical member 210, and the second contact set C2 is disposed on a second rotatable cylindrical member 230. The first and the second cylindrical members 210 and 230 are substantially parallel to each other. The first and second contact sets C1 and C2 are controlled by the operation handle 204 via the actuation structure 108 mounted in the cabinet 202 and coupled to the operation handle 204. In response to a movement of the operation handle 204, the actuation structure 108 imparts sequential movement to the first contact set C1, the second contact set C2 and finally the circuit breaker C3.

Figure 9B:
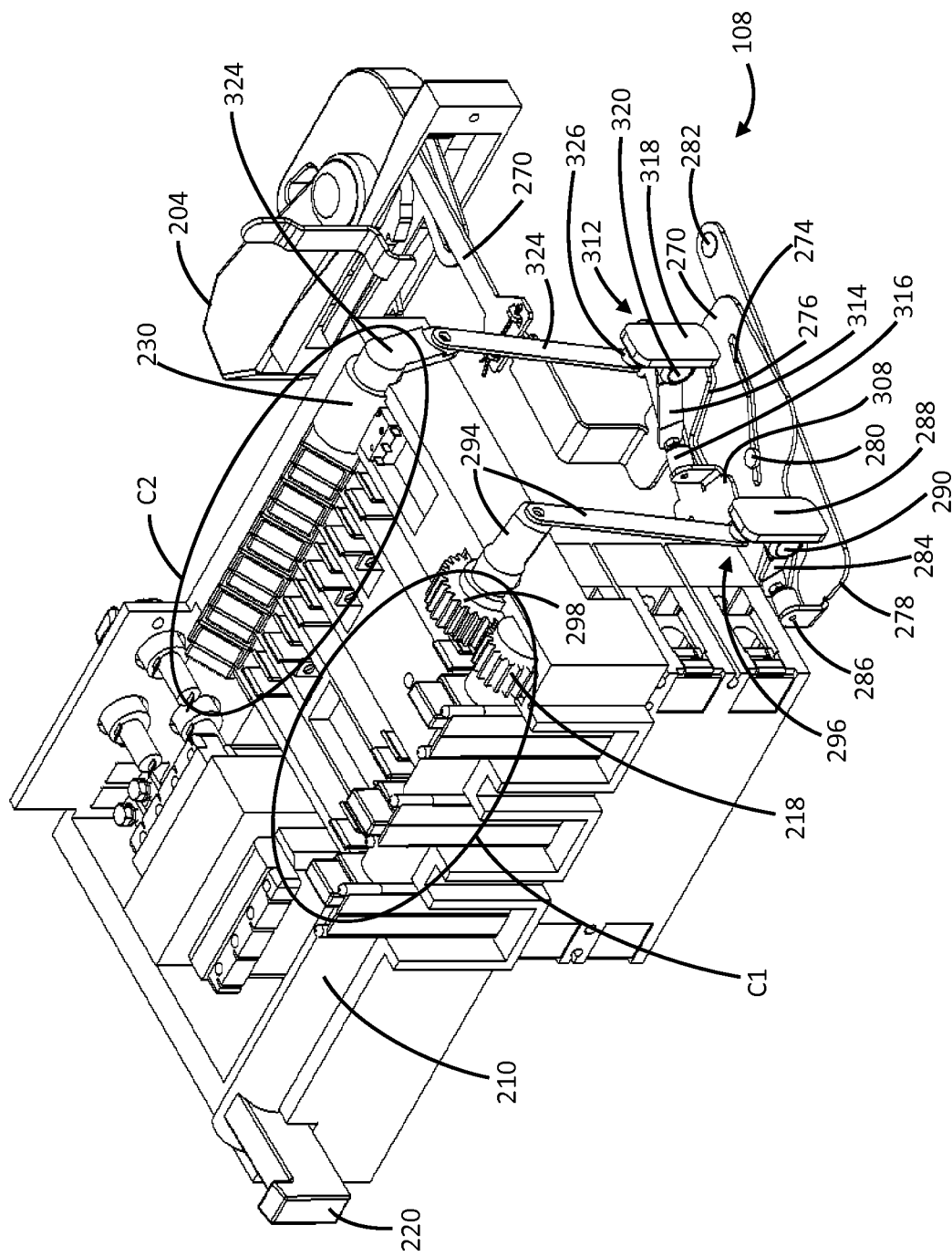

FIGS. 9A and 9B show the structure of the actuation structure 108. As shown, the actuation structure 108 comprises the operation handle 204 movably coupled to a master actuation shaft 270. As shown in FIG. 10, the master actuation shaft 270 comprises a first and a second J-slots 274 and 276 for actuating the first and second contact sets C1 and C2, respectively. The master actuation shaft 270 is also rotatably coupled, at a distal end 272, to a C3-actuation shaft 332 for switching the circuit breaker C3 between its OPEN and CLOSED positions.

Each of the first and second J-slots 274 and 276 may be divided to three sections S1, S2 and S3. Section S1 of the first J-slot 274 is angled to the movement direction 244 of the master actuation shaft 270, but sections S2 and S3 thereof are aligned with the movement direction 244. On the other hand, sections S1 and S3 of the second J-slot 276 are aligned with the movement direction 244, but section S2 thereof is angled with the movement direction 244. With this design, C1 and C2 are always actuated asynchronously.

Referring back to FIGS. 9A and 9B, a C1-actuation shaft 278 having a pin 280 is fixed to the bottom wall of the cabinet (not shown) at an end 282 such that the C1-actuation shaft 278 is rotatable about the end 282. The C1-actuation shaft 278 is also movably coupled to the master actuation shaft 270 by receiving the pin 280 in the first J-slot 274 thereof.

Figure 11B:
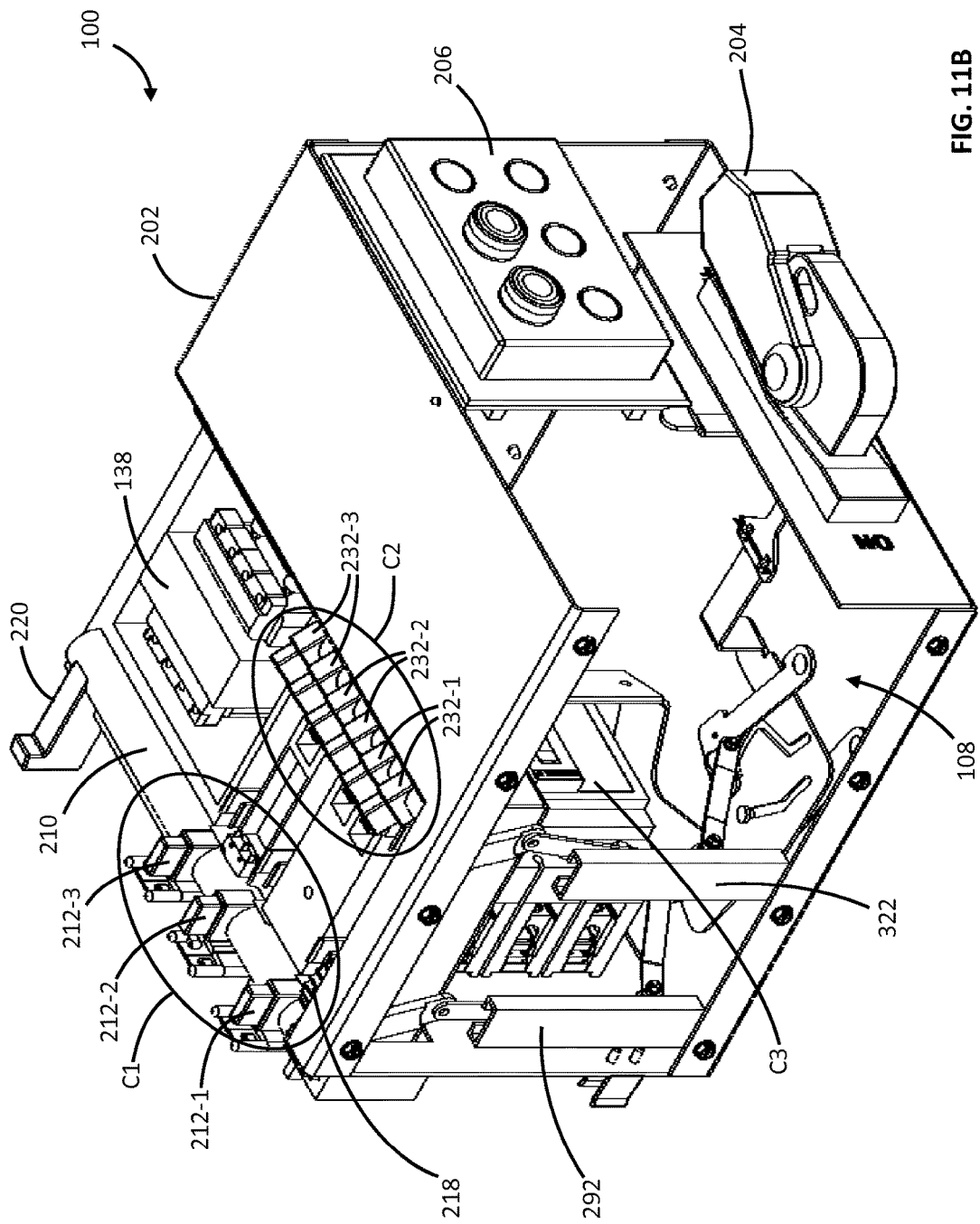
FIGS. 11B, 11D and 11E are left-front, right-back, and left-front isometric views, respectively, of the control module of FIG. 1A from different viewing angles when the control module is in the DISCONNECT state.
Figure 11D:
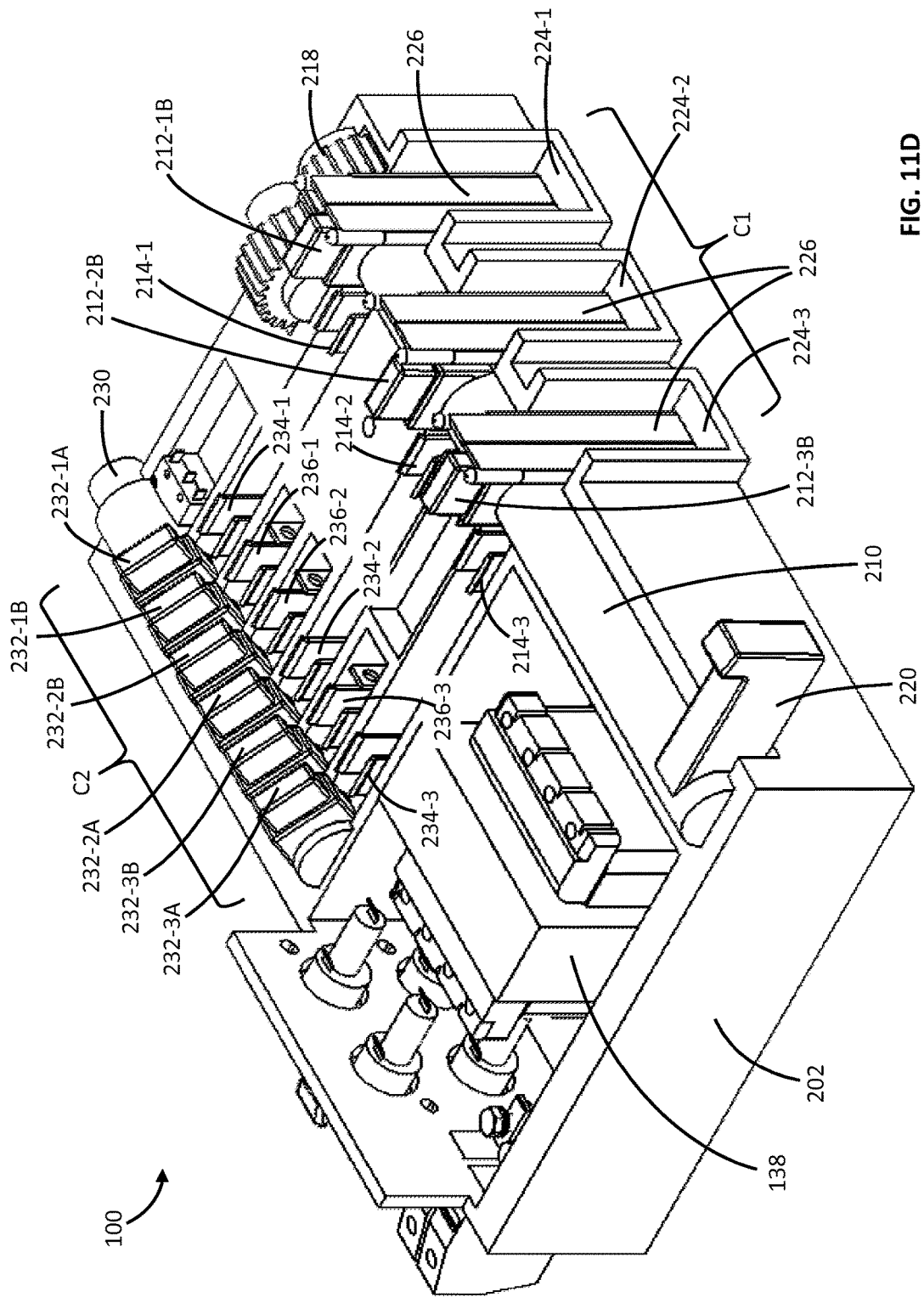
Figure 11F:
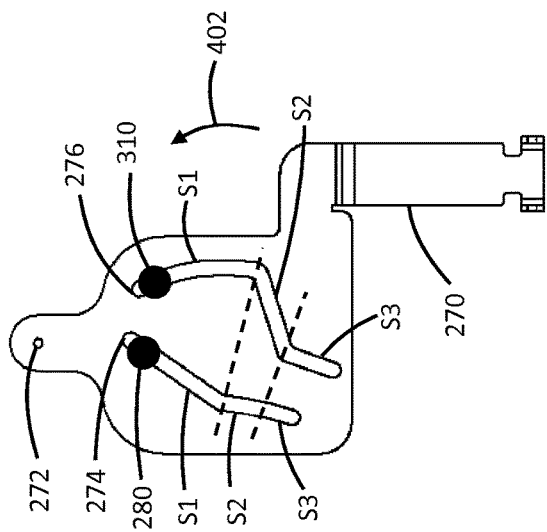
FIG. 11F is a top view of the master actuation shaft of the actuation structure of FIG. 9A when the control module is in the DISCONNECT state.

A C1-actuation arm 284 is rotatably coupled at one end to the C1-actuation shaft 278 by a pivot 286, and is rotatably coupled at the other end to a C1-actuation pad 288 by a pivot 290. The C1-actuation pad 288 is vertically slidable against a first post 292 (see FIG. 11A). The C1-actuation pad 288 is also rotatably coupled to a C1-actuation crank 294 by a pivot 296. The C1-actuation crank 294 comprises a meshed gear 298, which engages the gear 218 of the first cylindrical member 210 for transferring rotary motion to gear 218 and thereafter to the first cylindrical member 210 to switch the first contact set C1 between its OPEN and CLOSED positions.

A C2-actuation shaft 308 having a pin 310 is fixed to the bottom wall of the cabinet (not shown) at an end 312 such that the C2-actuation shaft 308 is rotatable about the end 312. The C2-actuation shaft 308 is also movably coupled to the master actuation shaft 270 by receiving the pin 310 in the second J-slot 276 of the master actuation shaft 270.

A C2-actuation arm 314 is rotatably coupled at one end to the C2-actuation shaft 308 by a pivot 316 and is rotatably coupled at the other end to a C2-actuation pad 318 by a pivot 320. The C2-actuation pad 318 is vertically slidable against a second post 322 (see FIG. 11A). The C2-actuation pad 318 is also rotatably coupled to a C2-actuation crank 324 by a pivot 326. The C2-actuation crank 324 is coupled to the second cylindrical member 230 for switching the second contact set C2 between its OPEN and CLOSED positions.

The master actuation shaft 270 is further rotatably coupled, at the distal end 272, to one end of the C3-actuation shaft 332. The other end of the C3-actuation shaft 332 comprises a notch receiving the switching handle 334 of the circuit breaker C3 for side-to-side switching of the circuit breaker C3 between its OPEN and CLOSED positions.

Operation

The operation of the control module 100 is now described. The control module 100 is inserted into the motor control center 10 with the operation handle 204 in a DISCONNECT position (described later), and the control module 100 is thus in the DISCONNECT state. Then, the control module 100 is secured in the motor control center 10 and the door 14 thereof is closed.

FIGS. 11A to 11F show the control module 100 at the DISCONNECT state, at which C1, C2 and C3 are all at their OPEN positions. At this state, the contacts 232-1, 232-2 and 232-3 of the second contact set C2 are disconnected from the terminals 232-1 to 234-3 and 236-1 to 236-3. The contacts 212-1, 212-2 and 212-3 of the first contact set C1 are fully retracted into the cabinet 202, disconnecting from the bus-bar (not shown), and the rear shutters 226 are closed. Therefore, the operator is isolated from the electricity being conducted from the bus-bars.

Moreover, the closed shutters 226 securely confine the first contact set C1 (while remaining in a retracted state) within the cabinet 202 and are prevented from even accidently protruding outside the cabinet 202. Accordingly, the first contact set C1 is shielded in a retracted state within the cabinet 202 and is safely isolated from the bus-bar. In this state, the control module 100 does not incorporate any voltage flow.

FIG. 11C shows the positions of the operation handle 204, which is currently at the DISCONNECT position. Corresponding to the four states shown in FIG. 4, the operation handle 204 also has four positions, DISCONNECT, TEST, OFF and ON. In this embodiment, the DISCONNECT position is at one end of the span of the overall range of motion of the operation handle 204, and the ON position is at the other end thereof. The TEST position is about one-third of the operation handle span from the DISCONNECT position, and the OFF position is about two-thirds of the operation handle span from the DISCONNECT position. The operation handle 204 may be shifted from any one position to a neighboring position thereof.

Figure 11E:
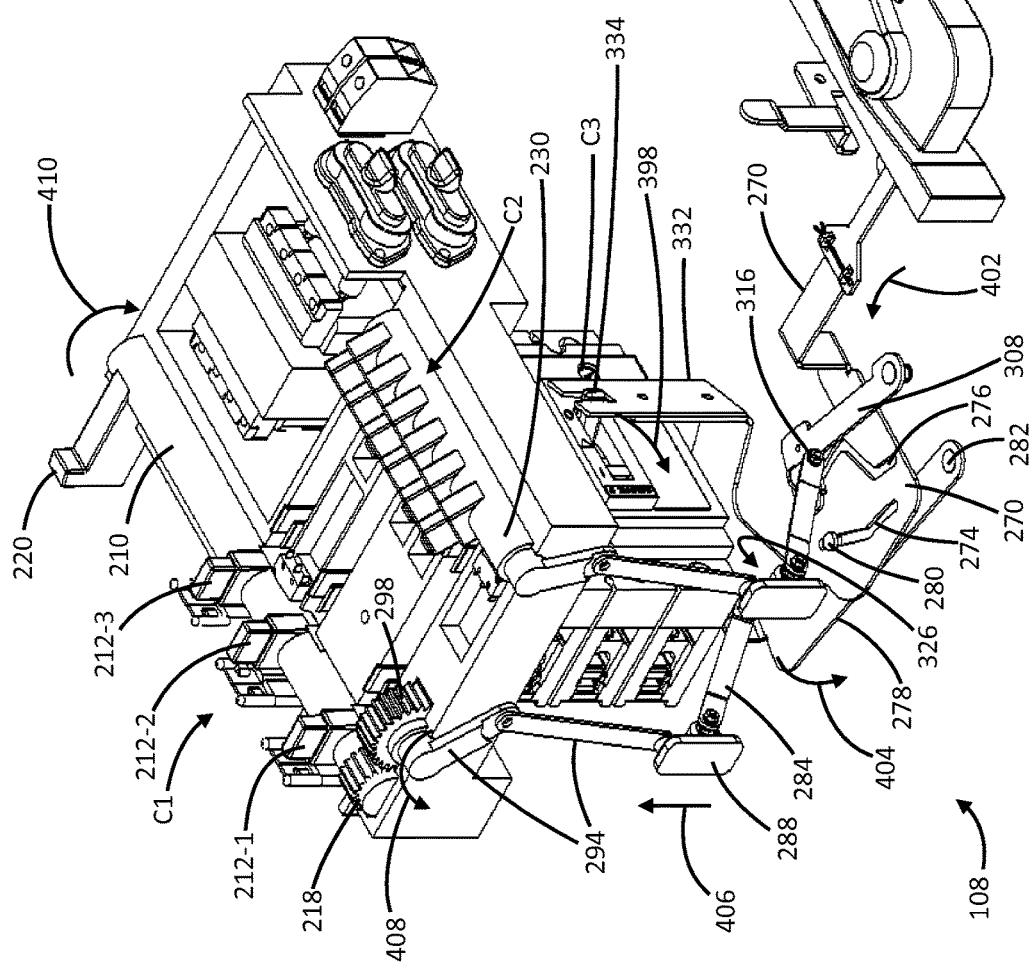

Referring to FIG. 11E, when an operator (not shown) shifts the operation handle 204 from the DISCONNECT position towards a TEST position along the direction indicated by the arrow 400, the operation handle 204 actuates the master actuation shaft 270 to move forward (indicated by arrow 402). Also referring to FIG. 11F, the pin 280 of the C1-actuation shaft 278 and the pin 310 of the C2-actuation shaft 308 are both in section S1 of the first and second J-slots 274 and 276, respectively.

As section S1 of the second J-slot 276 is aligned to the movement direction 402 of the master actuation shaft 270, the C2-actuation shaft 308 is not actuated, and the second contact set C2 remains at the OPEN position. However, the first J-slot 274 is angled to the movement direction of the master actuation shaft 270. Thus, the C1-actuation shaft 278 is urged, via the pin 280, to rotate outward about its end 282 (arrow 404), which in turn pushes the C1-actuation pad 288 upward (arrow 406) via the C1-actuation arm 284. The C1-actuation pad 288 drives the C1-actuation crank 294 and to rotate the gear 298 (arrow 408). The gear 298 of the crank 294 then drives the gear 218 of the first cylindrical member 210 to rotate the contacts 212-1, 212-2 and 212-3 (arrow 410).

Figure 12A:
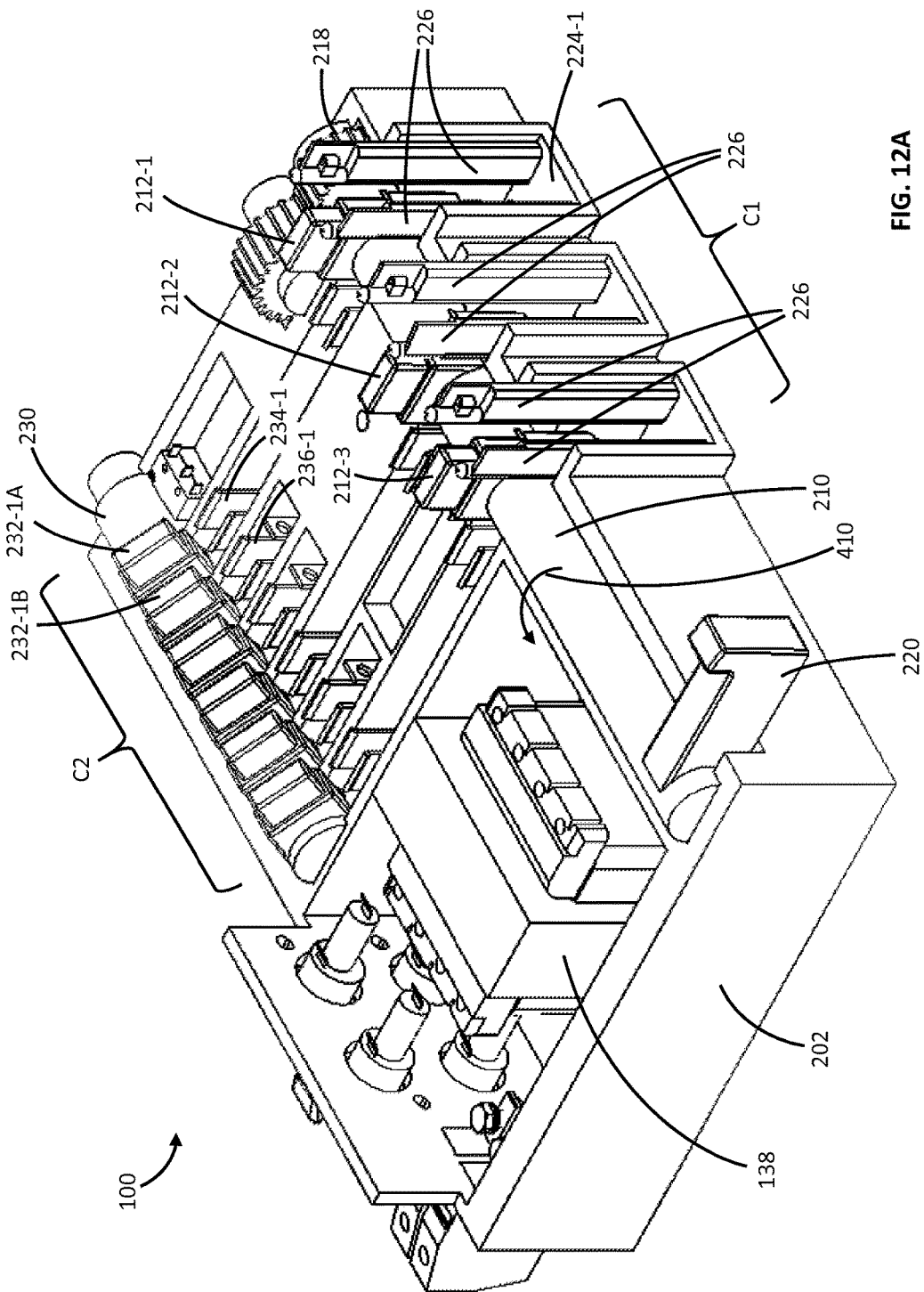
FIGS. 12A to 12D are right-back, left-front, right-back and left-back isometric views, respectively, of the control module of FIG. 1A from different viewing angles when the control module is transiting from the DISCONNECT state to a TEST state.
Figure 12B:
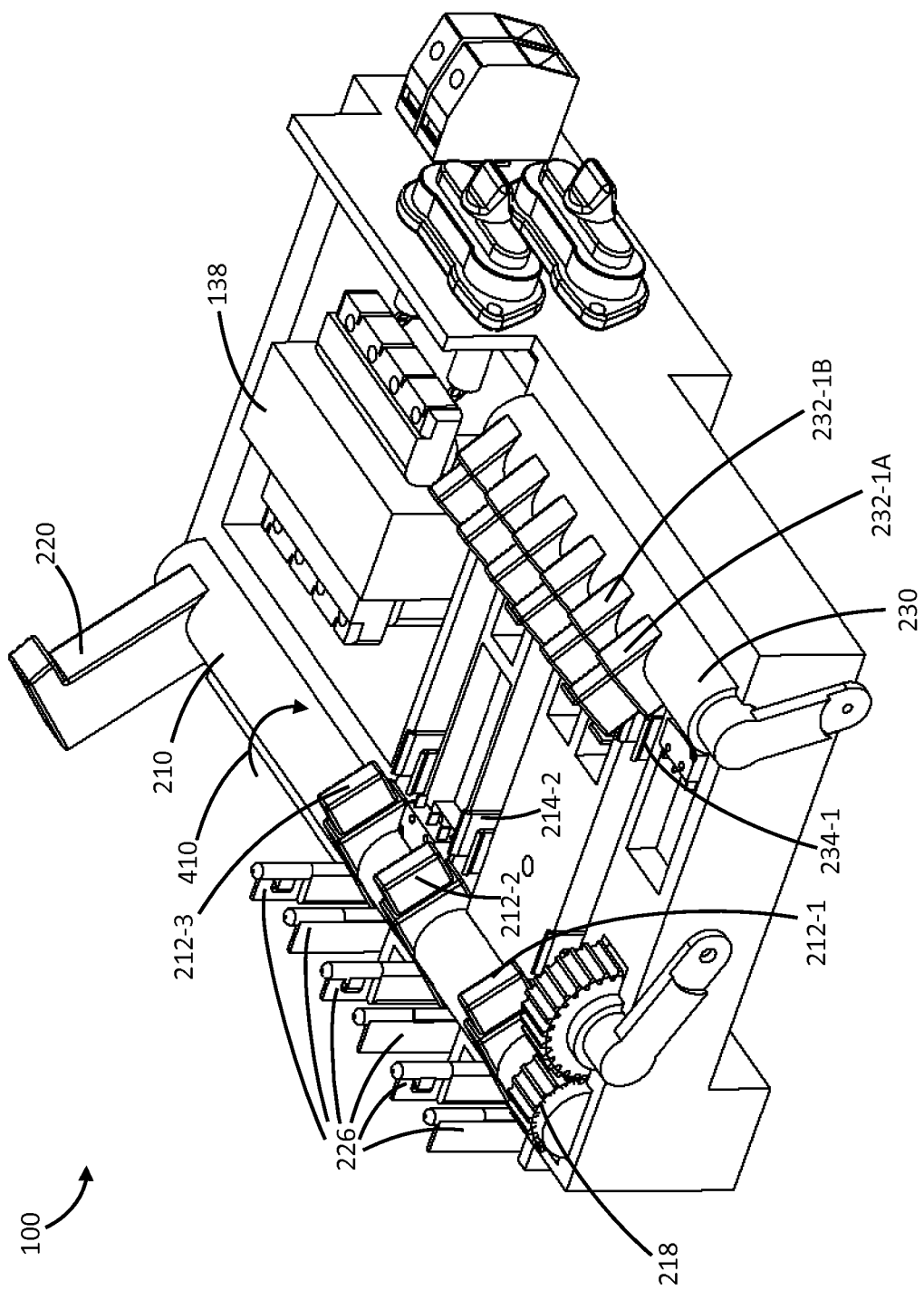
Figure 12C:
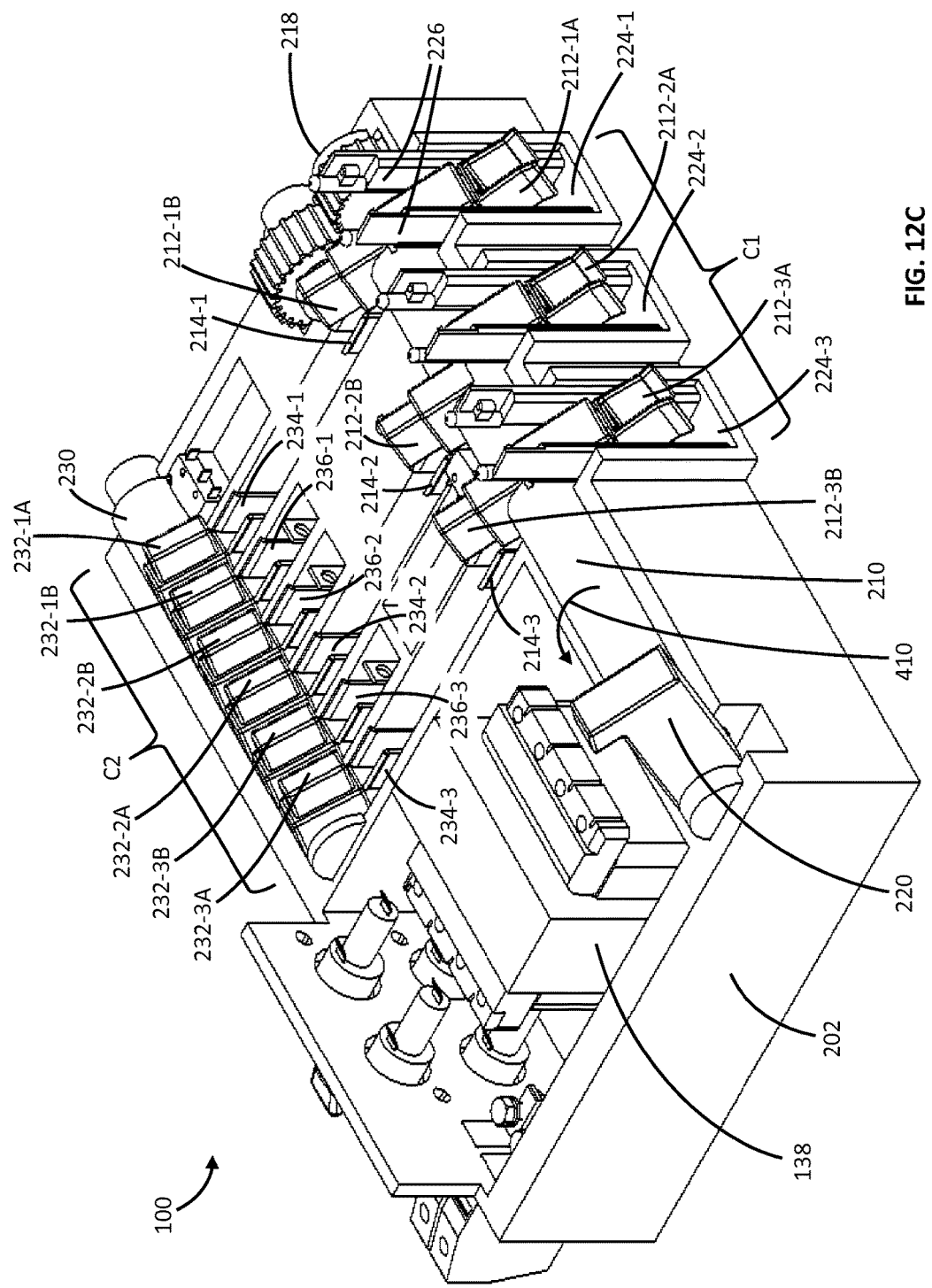
Figure 12D:
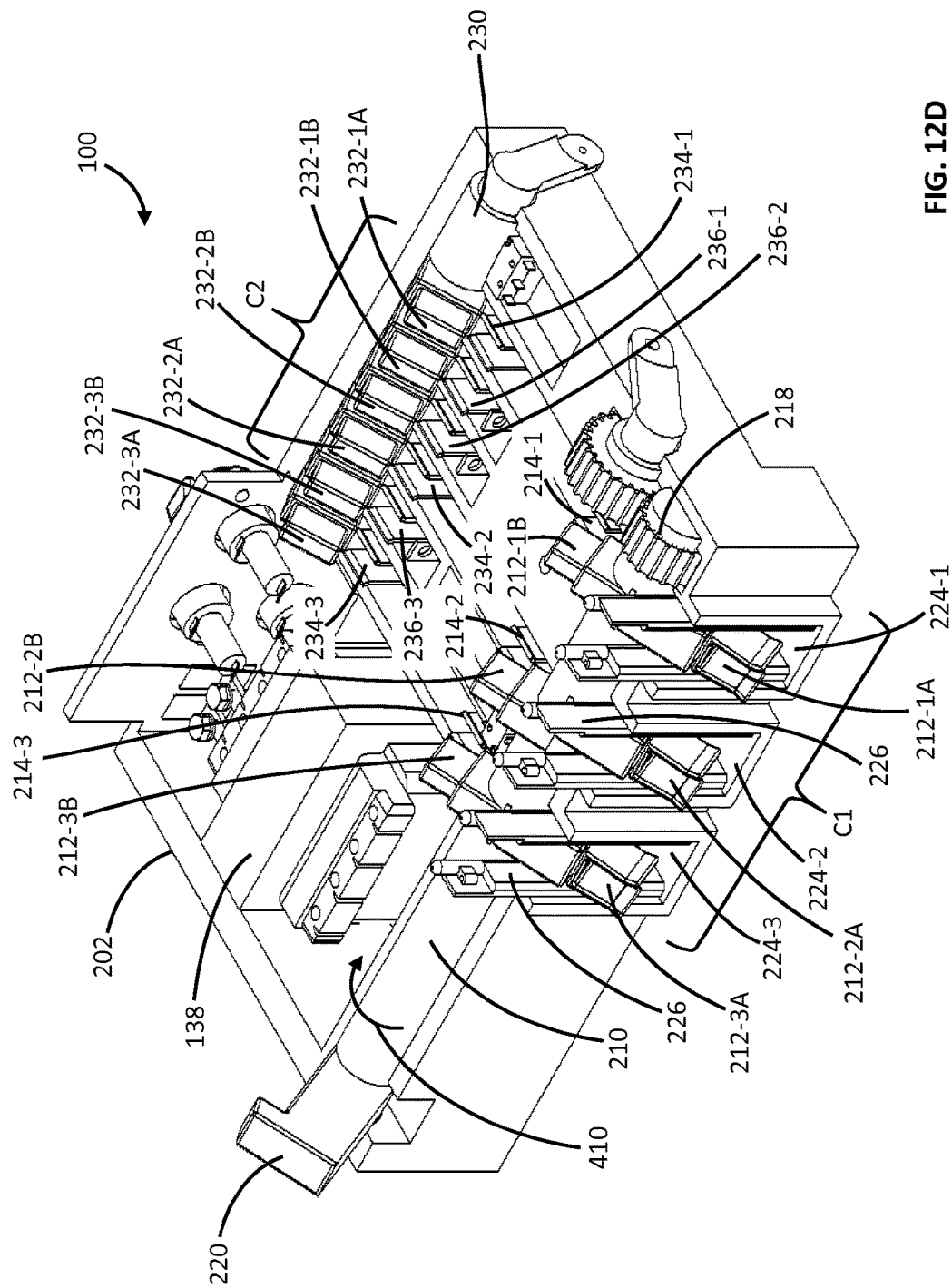

As shown in FIGS. 12A and 12B, when the cylindrical member 210 is rotated along the direction 410, the external prongs (not shown) of the first contacts 212-1, 212-2, 212-3, respectively, are rotated upwardly and outwardly, pushing the corresponding shutter 226 to swing outwardly and open. As shown in FIGS. 12C and 12D, with the rotation of the first cylindrical member 210, the external prongs 212-1A, 212-2A, 212-3A of the first contacts 212-1, 212-2, 212-3 extend out of the cabinet 202.

As shown in FIGS. 13A to 13G, with the operation handle 204 being shifted from the DISCONNECT position to the TEST position (arrow 400), the control module 100 is transited from the DISCONNECT state to the TEST state. The first cylindrical member 210 is rotated to the CLOSED position. As a result, the external prongs 212-1A, 212-2A, 212-3A of the first contacts 212-1, 212-2, 212-3 are fully extended out of the cabinet 202, and coupled to the bus-bar (not shown). The second contact set C2, however, remains electrically separated from the first contact set C1 as the movement of the operation handle 204 has not yet actuated the rotation of the second cylindrical member 230.

The control module 100 then reaches its TEST state, and the first intermediate circuit 132 is connected to the bus-bar. In particular as illustrated in FIG. 13G, one phase of electrical voltage V is conducted from the bus-bar through the first contact 212-3 (i.e., the external prongs 212-3A and internal prongs 213-3B) and the electrical terminal 214-3 to the receiving terminal 234-3. Similarly, the other two phases of electrical voltage V are conducted from the bus-bar to receiving terminals 234-2 and 234-1, respectively.

From the receiving terminals 234-1 to 234-3, electricity will also be provided to the control transformer 138 via a primary control transformer fuse (not shown) for converting the high voltage (e.g., 640 or 480 VAC) received from the bus-bar to a low voltage (e.g., 120 VAC), and then to a secondary control circuit terminal block via a secondary control transformer fuse (not shown), establishing the electrical testing path 106. An operator may then conduct testing and/or maintenance operation by connecting, e.g., a testing device 112 to the secondary control circuit terminal block, while being completely isolated from the high voltage.

Only safe or test power is supplied to the internal components. Moreover, the second contact set C2 is open to prevent high voltage from entering an internal compartment area.

Figure 13A:
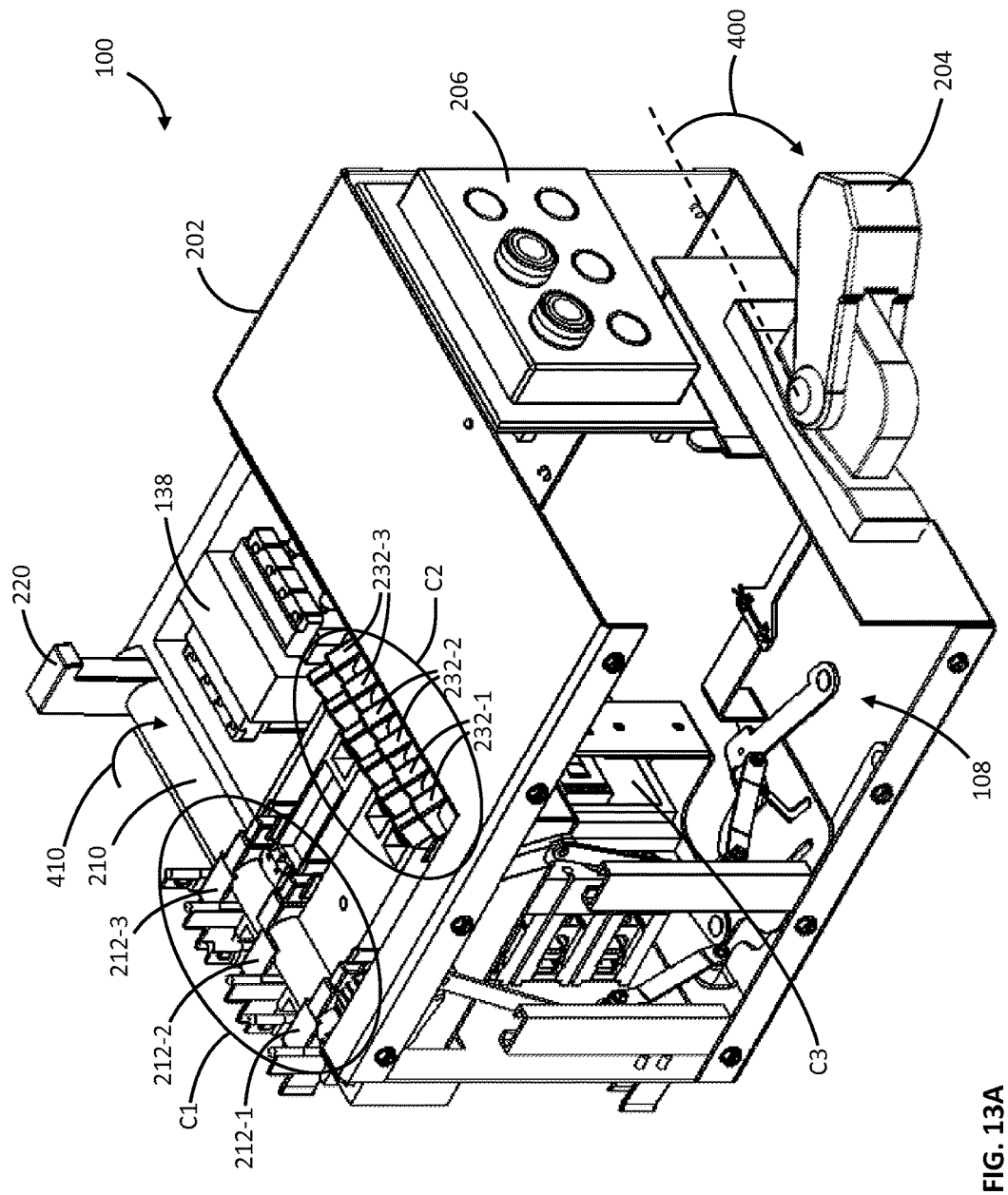
FIGS. 13A, 13B, 13F and 13G are left-front, left-front, right-back and left-back isometric views, respectively, of the control module of FIG. 1A from different viewing angles when the control module is in the TEST state.
Figure 13C:
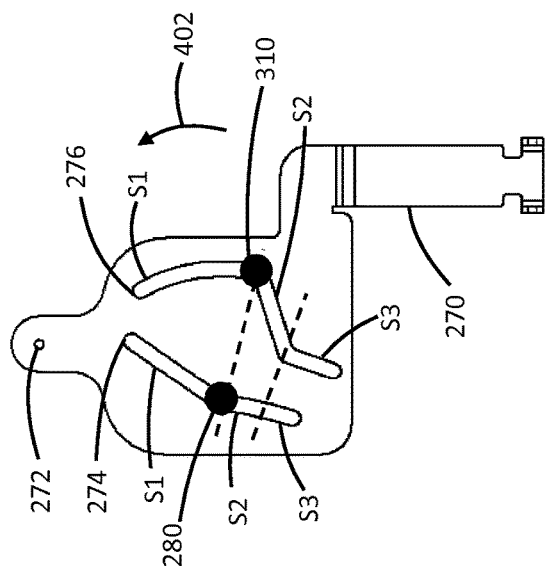
FIG. 13C is a top view of the master actuation shaft of the actuation structure of FIG. 9A when the control module is in the TEST state.

As shown in FIG. 13C, at the TEST state, the pin 280 of the C1-actuation shaft 278 and the pin 310 of the C2-actuation shaft 308 are both at the respective positions between sections S1 and S2 of the J-slots 274 and 276, respectively.

Figure 13B:
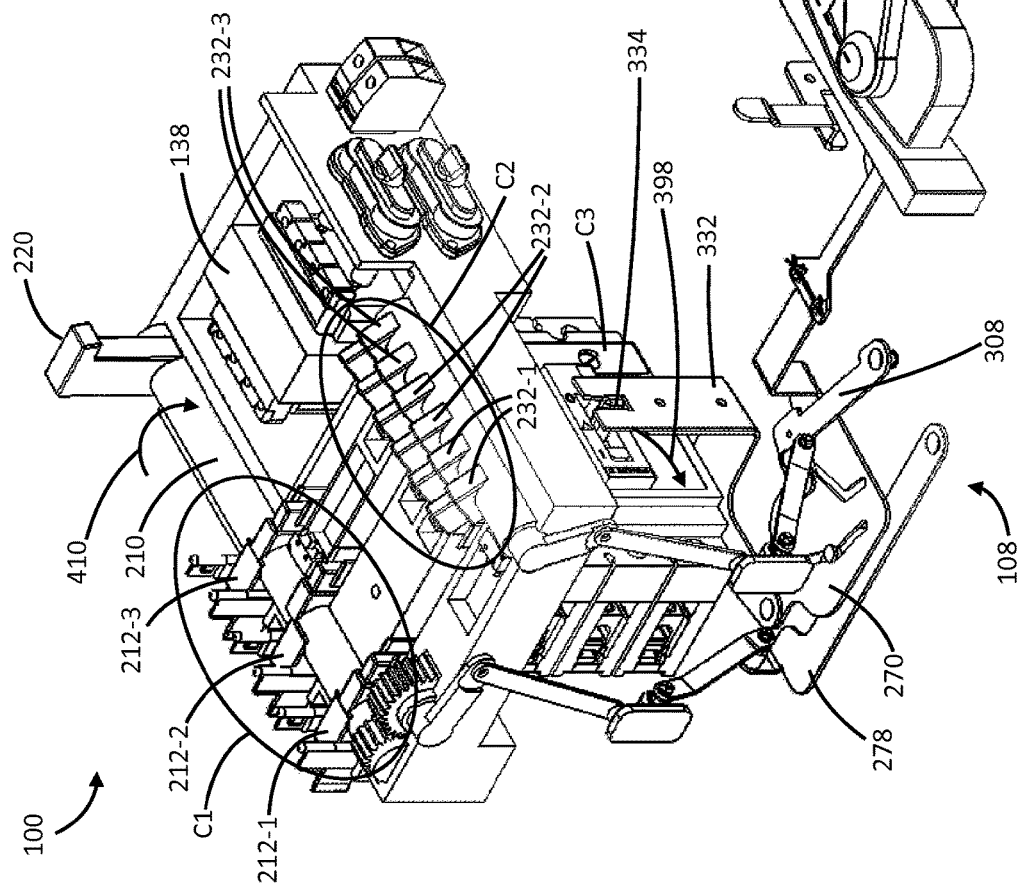

Illustrated in FIG. 13B, during the transition from the DISCONNECT state to the TEST state, the master actuation shaft 270 also urges the C3-actuation shaft 332 to rotate, moving the switching handle 334 of the circuit breaker C3 away from its OPEN position (arrow 398), but without reaching its CLOSED position. Thus, the circuit breaker C3 still remains at a non-conducting state.

Figure 13E:
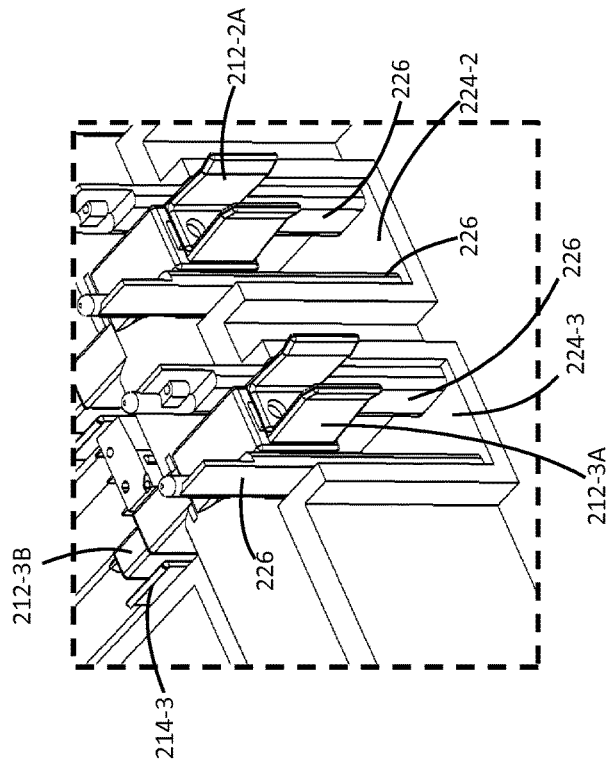
FIG. 13E is an isometric view of a portion of the control module of FIG. 1A when the control module is in the TEST state, showing the detail of the external prongs of the first set of contacts.
Figure 13D:
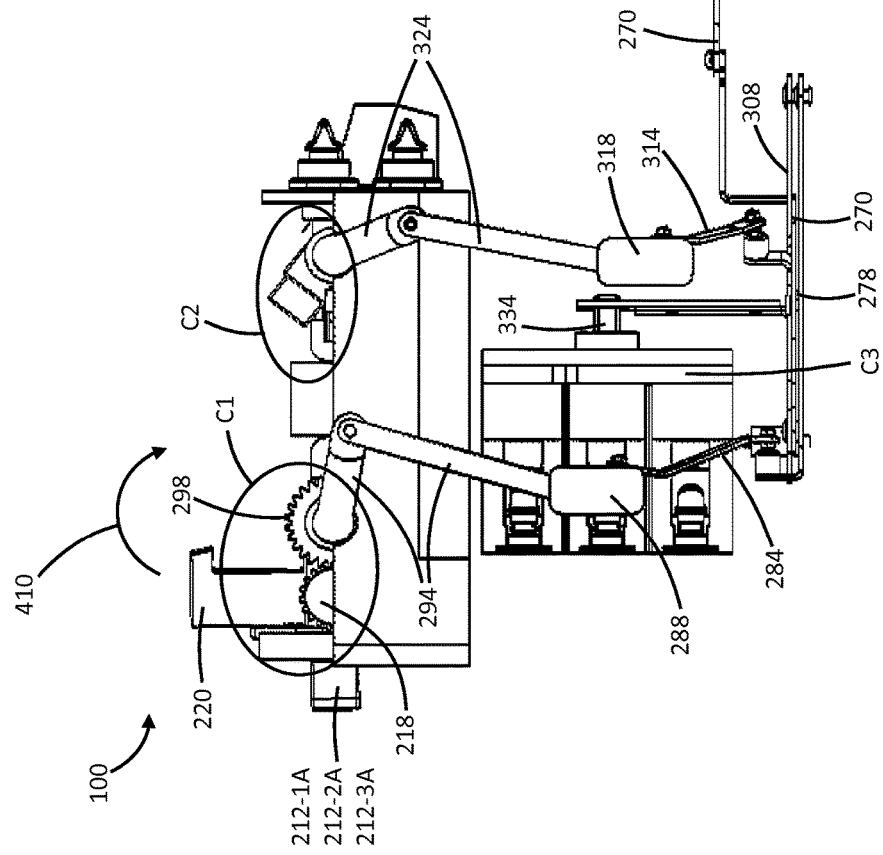
FIG. 13D is a left-side view of the control module of FIG. 1A when the control module is in the TEST state.
Figure 13F:
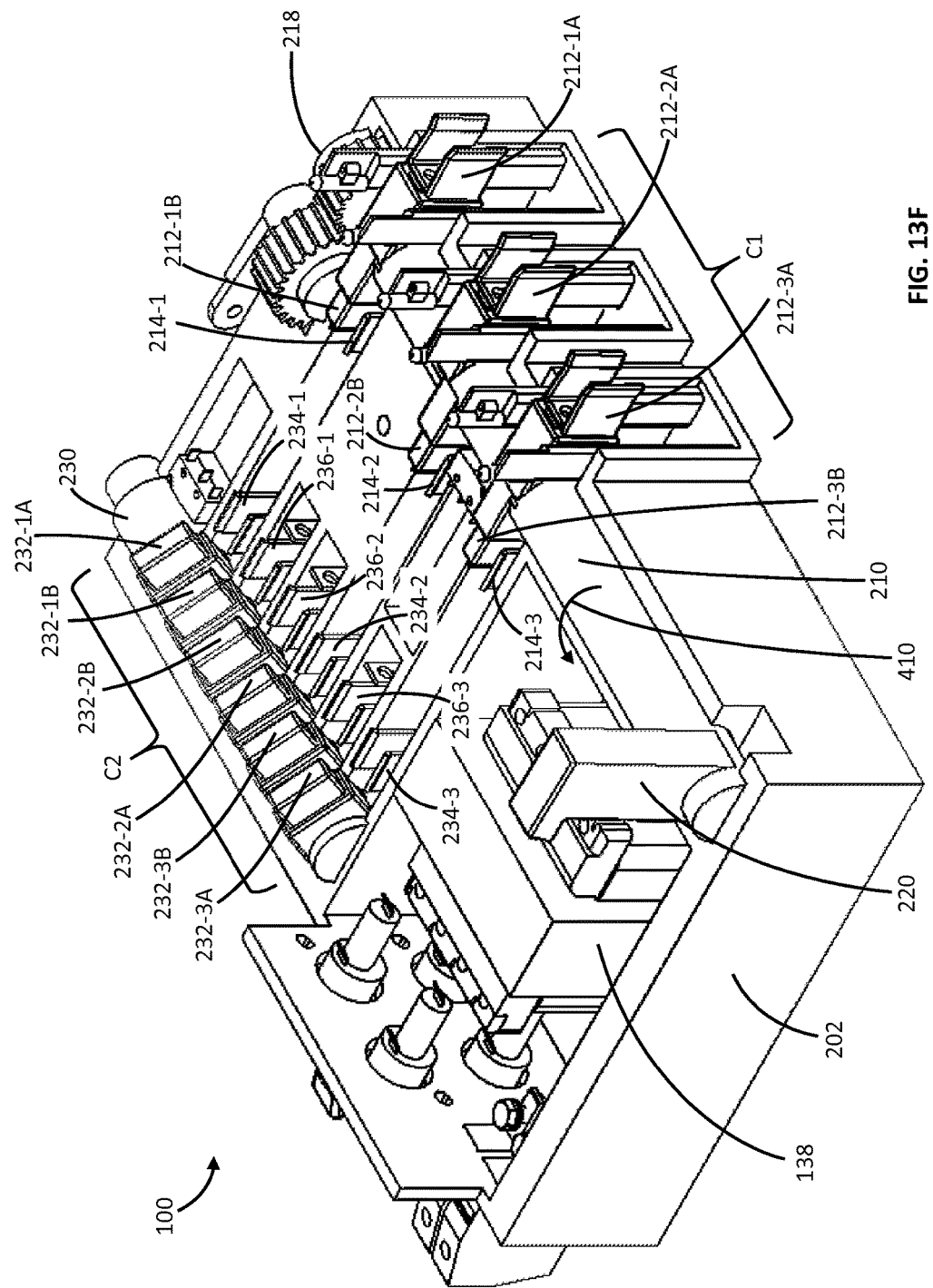
Figure 13G:
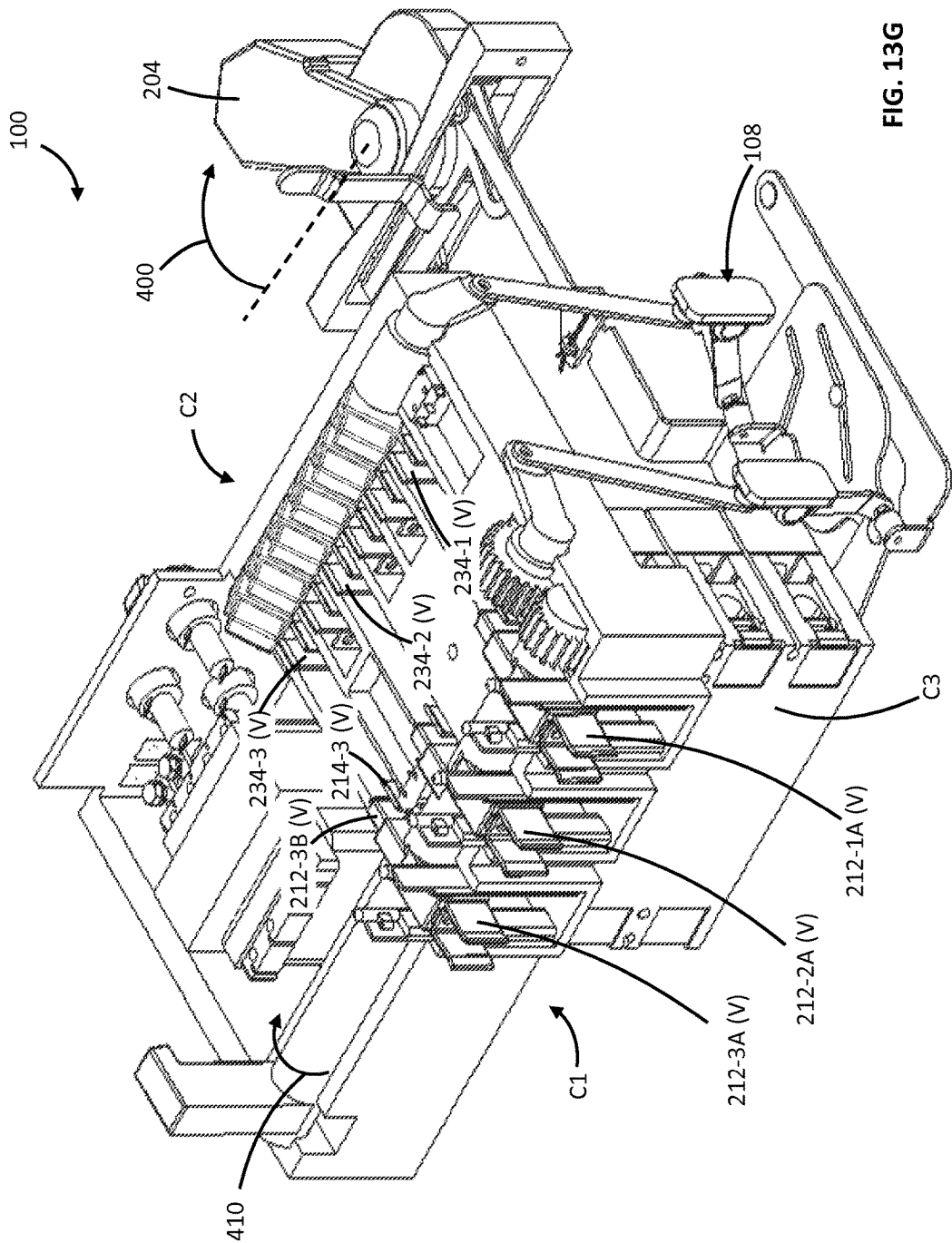

The extension of the first contacts 212 is coordinated with the opening of the shutters 226 that open in response to the operation handle 204 reaching the TEST position. Accordingly, by opening of the shutters 226, the first contacts 212 are able to protrude and connect to the bus-bar. FIG. 13E clearly shows the open shutters 226 and the protrusion of the first contacts 212 outside the control module 100.

The rotation of the first cylindrical member 210 along the direction 410 also rotates the hook 220 upwardly. When the control module 100 reaches its TEST state, the hook 220 engages a corresponding locking mechanism (not shown) of the compartment 12 that accommodates the control module 100, and locks the control module 100 therein.

In an implementation, the TEST state may also be referred to as a LOW VOLTAGE DISCONNECTED/CIRCUIT BREAKER OFF state.

If the operation handle 204 is shifted from the TEST position back to the DISCONNECT position, the first cylindrical member 210 is rotated along a direction opposite to that indicated by the arrow 410. The first contact set C1 is switched to the OPEN position. The first contacts 212-1, 212-2, 212-3 are disconnected from the bus-bar 102 and retracted into the cabinet 202 (see FIGS. 11A to 11D). The control module 100 is then switched back to the DISCONNECT state. The hook 220 is also disengaged from the compartment 12.

As shown in FIGS. 14A to 14F, the control module 100 transits from the TEST state to the OFF state when the operation handle 204 is shifted from the TEST position to the OFF position. The OFF state may also be referred to as a LOW VOLTAGE SUPPLIED/CIRCUIT BREAKER OFF state.

Figure 14A:
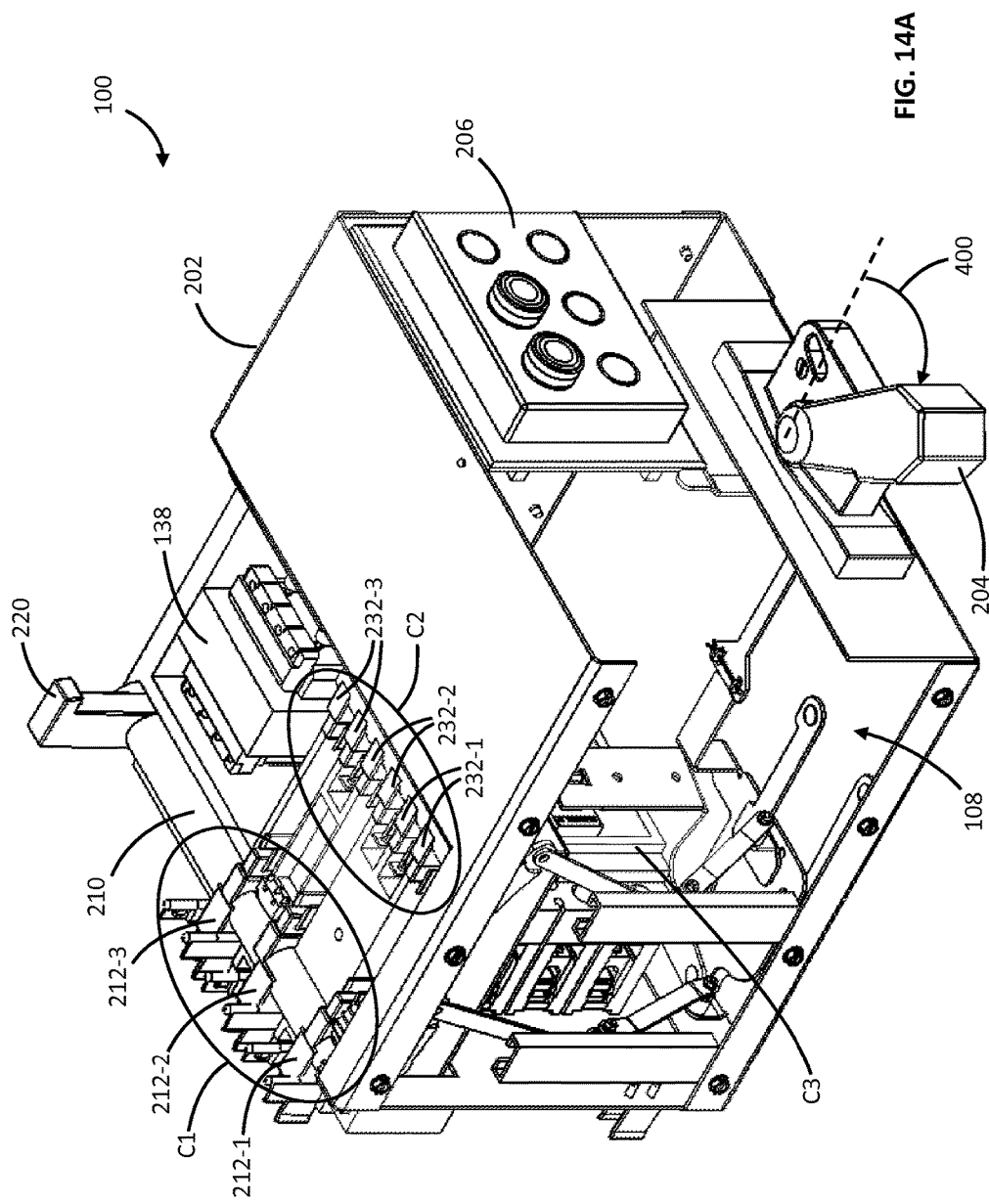
FIGS. 14A, 14B, 14E and 14F are left-front, left-front, right-back and left-back isometric views, respectively, of the control module of FIG. 1A from different viewing angles when the control module is in an OFF state.
Figure 14C:
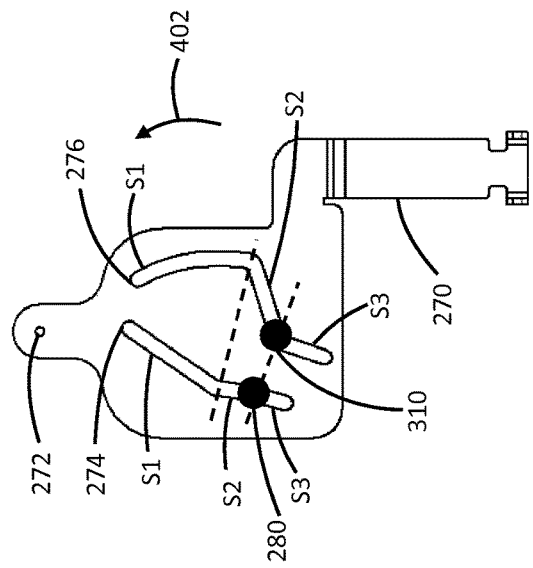
FIG. 14C is a top view of the master actuation shaft of the actuation structure of FIG. 9A when the control module is in the OFF state.

As shown in FIG. 14C, the pins 280 and 310 are moving in section S2 of the J-slots 274 and 276, respectively, during this transition. As section S2 of the J-slot 274 is aligned to the movement direction 402 of the master actuation shaft 270, the first contact set C1 is not further actuated. However, as section S2 of the J-slot 276 is angled to the movement direction 402, the master actuation shaft 270 urges the C2-actuation shaft 308, C2-actuation arm 314, C2-actuation pad 318 and C2-actuation crank 324 to rotate the second cylindrical member 230 and contacts 232-1 to 232-3 of the second contact set C2 downwardly (arrow 412). When the operation handle 204 arrives to the OFF position, the contact prongs 232-1A, 231-1B, 232-2A, 231-2B, 232-3A and 231-3B of the second contact set C2 are connected to electrical terminals 234-1, 236-1, 234-2, 236-2, 234-3 and 236-3, respectively (see FIG. 14E). The second contact set C2 is thus switched from the OPEN position to the CLOSED position, connecting the second intermediate circuit 134 to the first intermediate circuit 132.

Figure 14B:
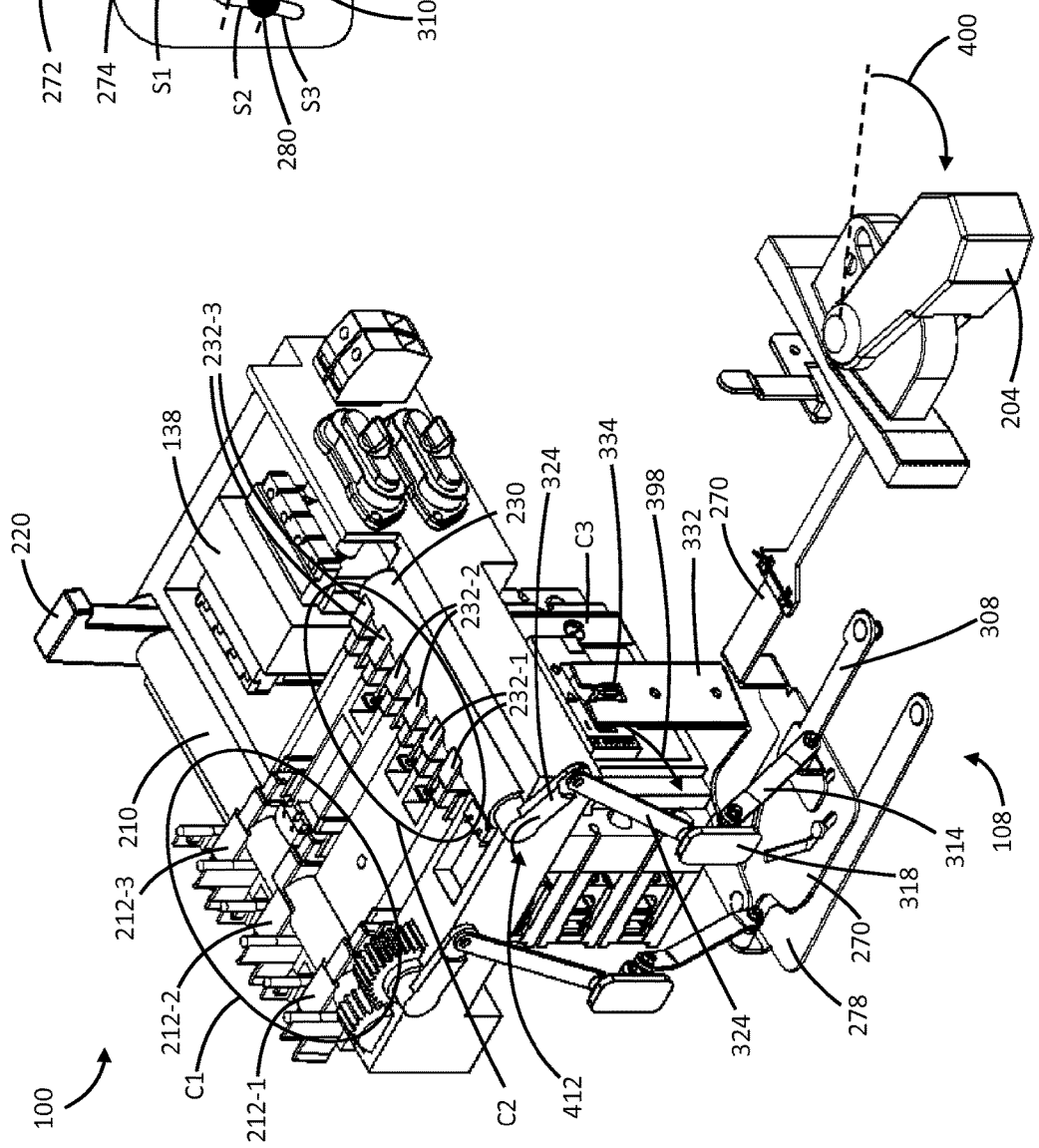
Figure 14E:
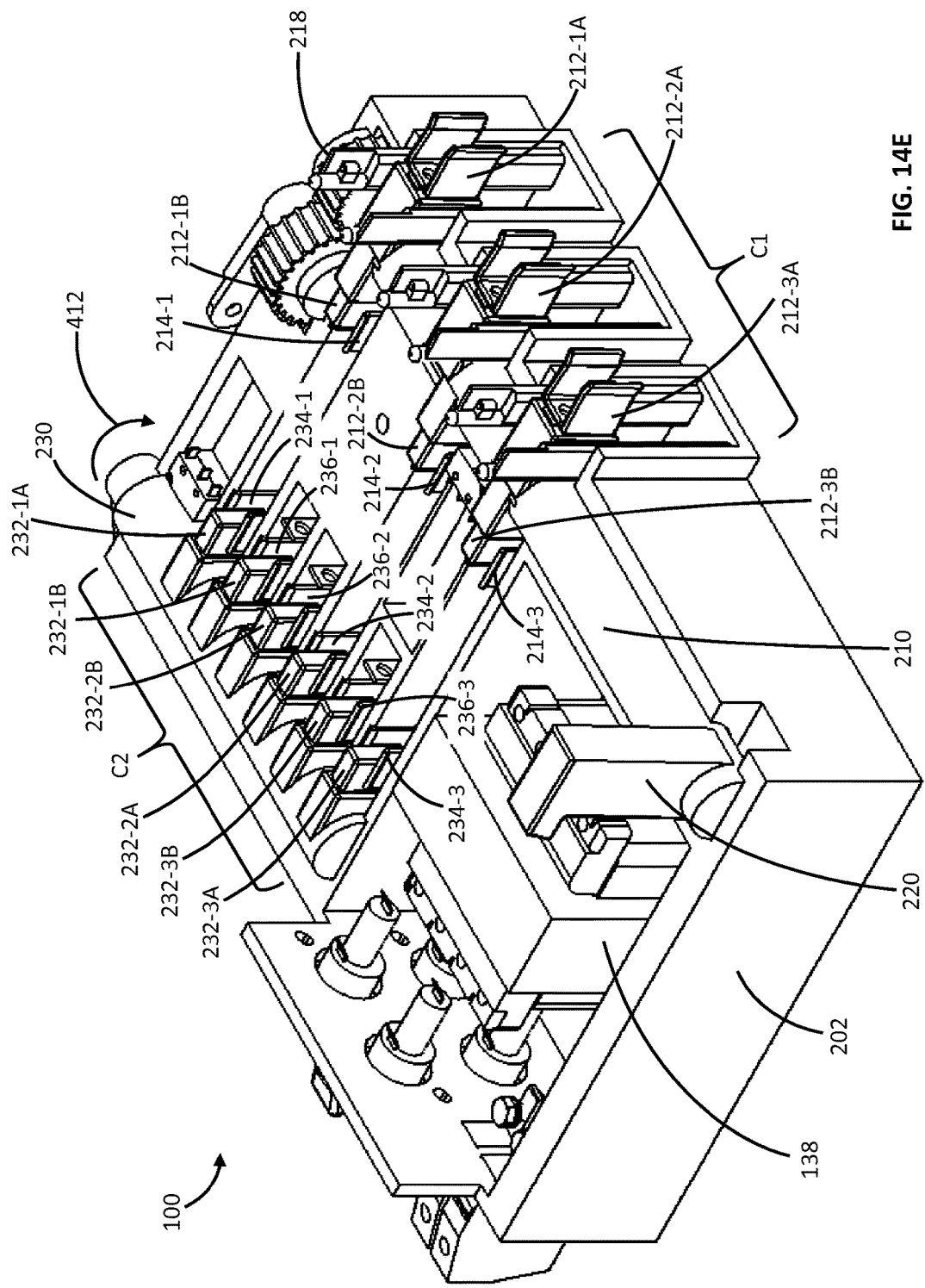
Figure 14F:
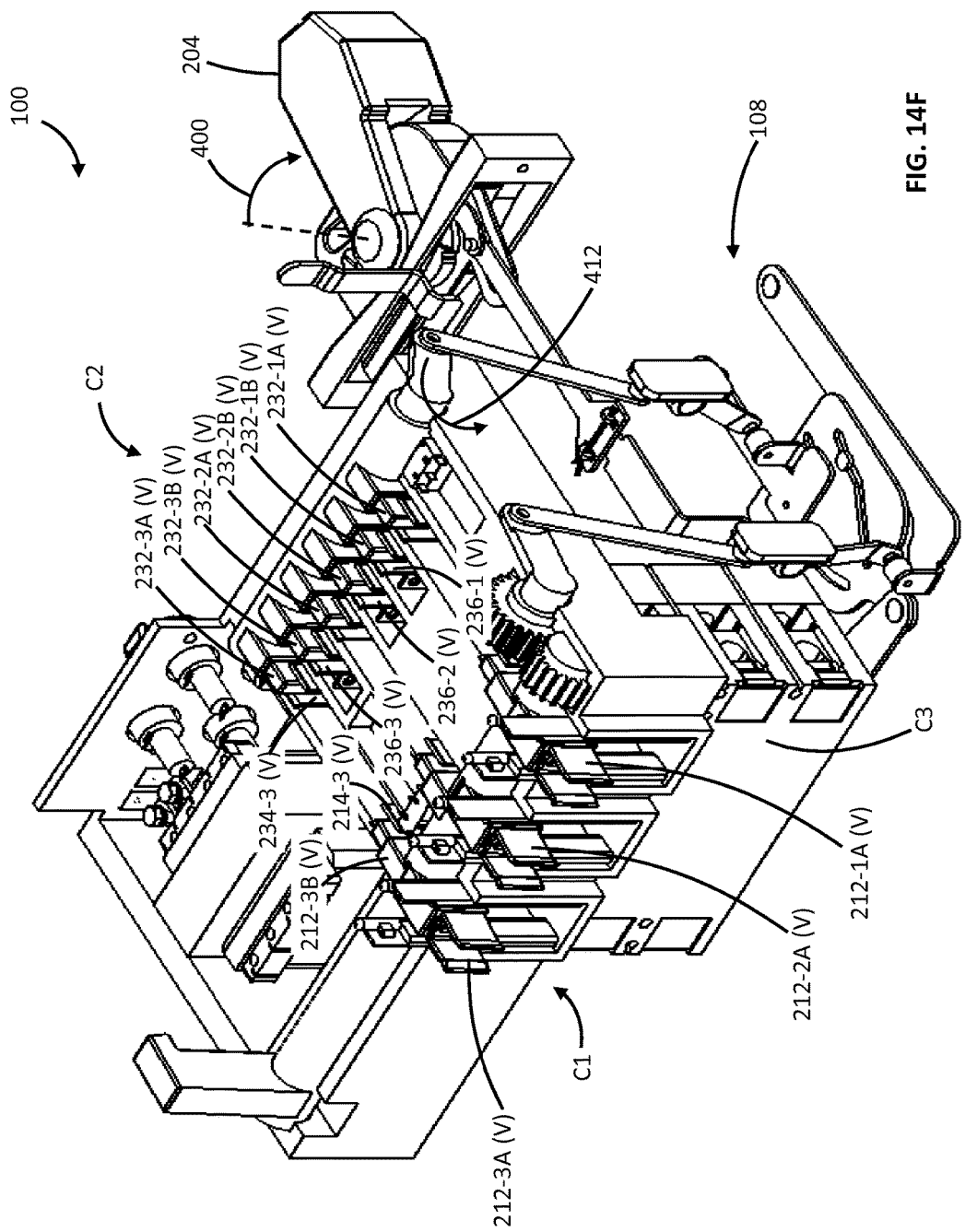

In particular as illustrated in FIG. 14F, one phase of electrical voltage V is conducted from the bus-bar through the first contact 212-3 (i.e., the external prongs 212-3A and internal prongs 212-3B), the electrical terminal 214-3, the receiving terminal 234-3, contact 232-3 (i.e., receiving prong 232-3A and passing prong 232-3B) to the passing terminal 236-3, which passes the electrical voltage V to the LINE side of the circuit breaker C3. Similarly, the other two phases of electrical voltage V are also conducted from the bus-bar to the LINE side of the circuit breaker following similar paths. Now, the electricity is supplied to the internal components.

Illustrated in FIG. 14B, during the transition from the TEST state to the OFF state, the master actuation shaft 270 also urges the C3-actuation shaft 332 to rotate, moving the switching handle 334 of the circuit breaker C3 further away from its OPEN position (arrow 398), but without reaching its CLOSED position. Thus, the circuit breaker C3 still remains at its non-conducting state.

If the operation handle 204 is shifted from the OFF position back to the TEST position, the second cylindrical member 230 is rotated along a direction opposite to that indicated by the arrow 412. The second contact set C2 is switched to the OPEN position. The second contacts 232-1, 232-2 and 232-3 are disconnected from their respective electrical terminals. The control module 100 is then switched back to the TEST state.

As shown in FIGS. 15A to 15F, the control module 100 transits from the OFF state to the ON state when the operation handle 204 is shifted from the OFF position to the ON position. The ON state may also be referred to as a LOW VOLTAGE SUPPLIED/CIRCUIT BREAKER ON state.

As shown in FIG. 15C, the pins 280 and 310 are moving in section S3 of the J-slots 274 and 276, respectively, during this transition. As sections S3 of the both J-slots 274 and 276 are aligned to the movement direction 402 of the master actuation shaft 270, the first and second contact sets C1 and C2 are not further actuated. However, the master actuation shaft 270 further urges the C3-actuation shaft 332 to rotate, eventually moving the switching handle 334 of the circuit breaker C3 to reach its CLOSED position (arrow 398). The circuit breaker C3 is then switched to a conducting state, connecting the load 110 to the power supplied from the bus-bar 102, via the first, second and third intermediate circuits 132, 134 and 136.

Figure 15A:
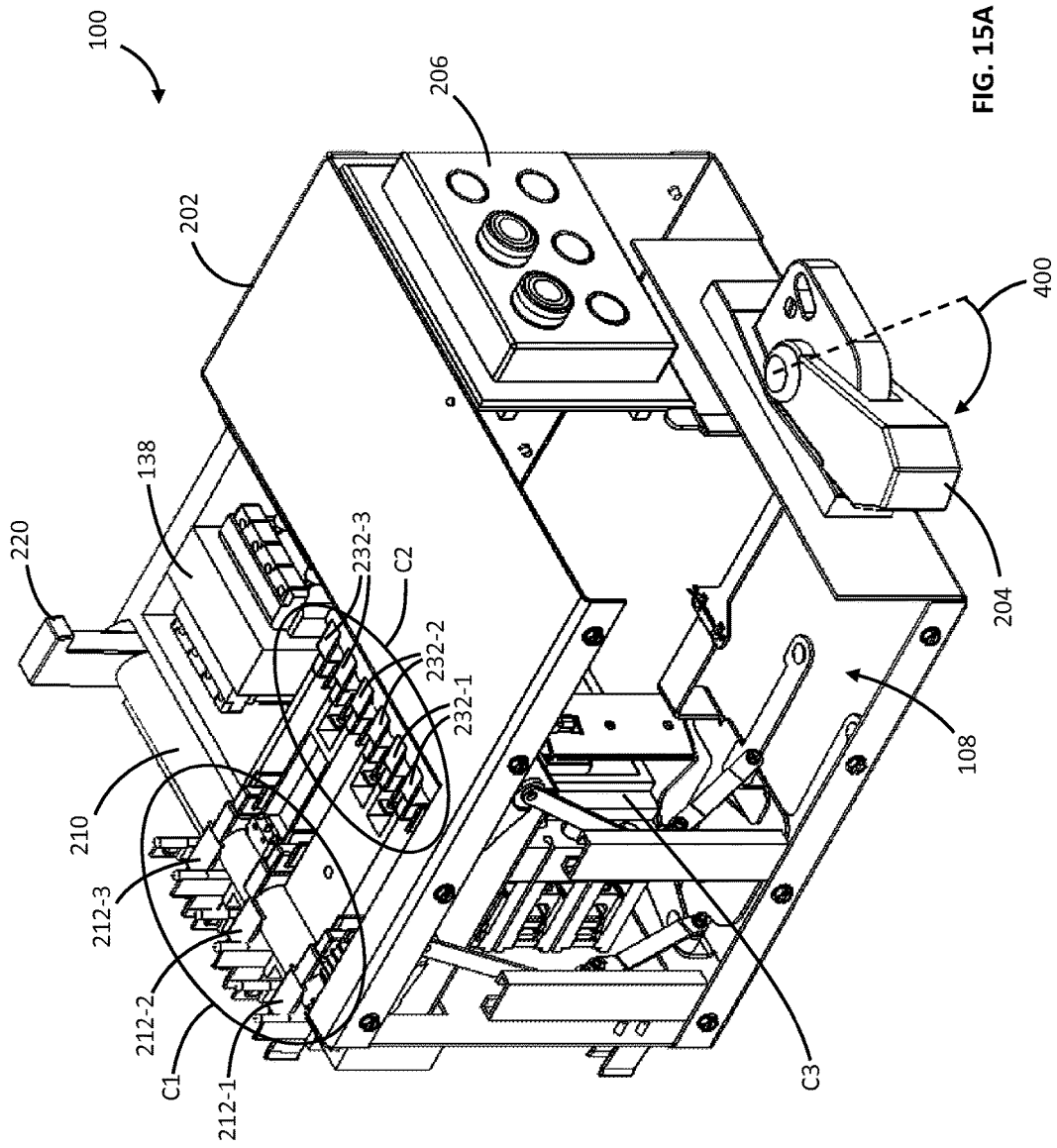
Figure 15D:
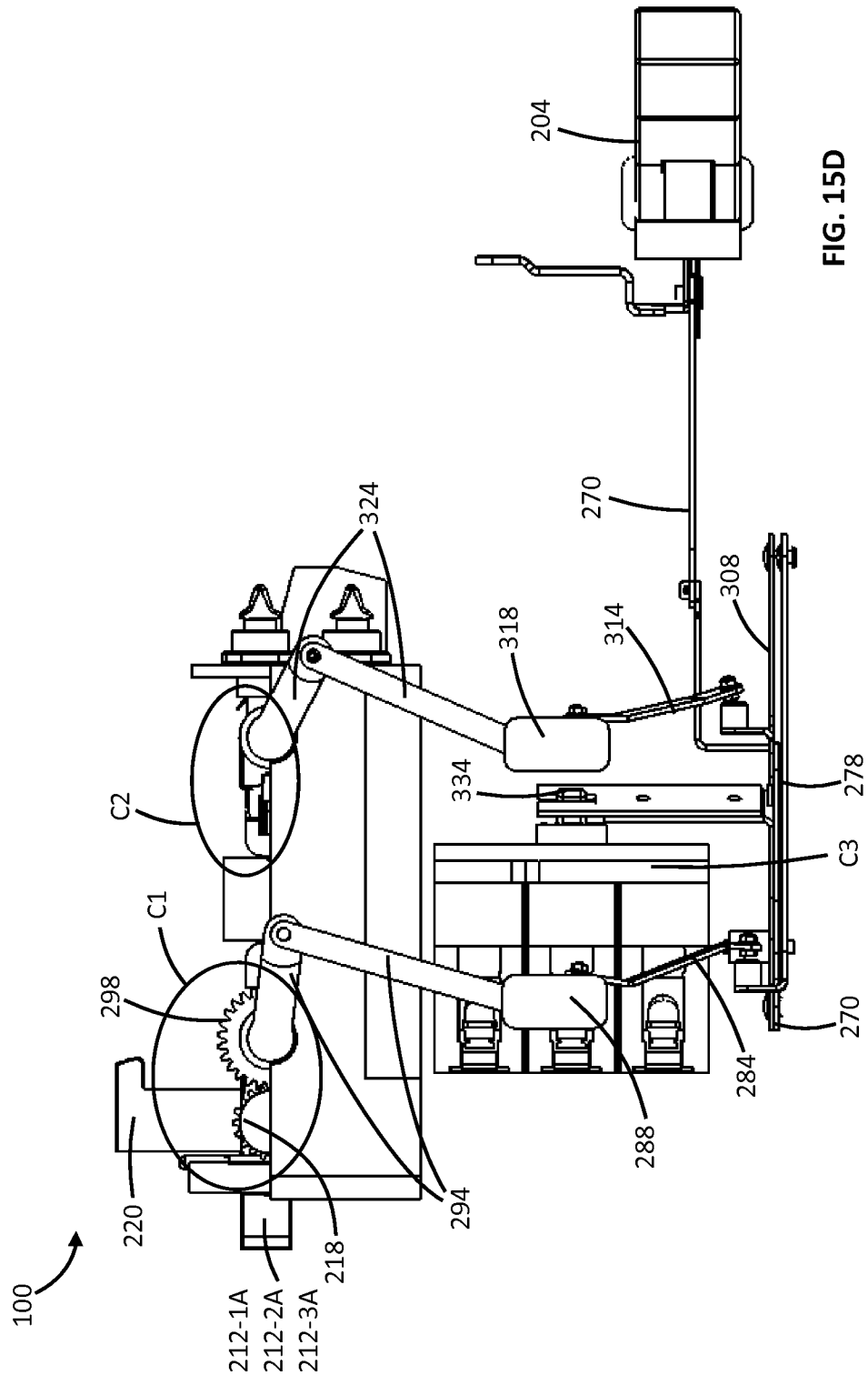
FIG. 15D is a left-side view of the control module of FIG. 1A when the control module is in the ON state.
Figure 15E:
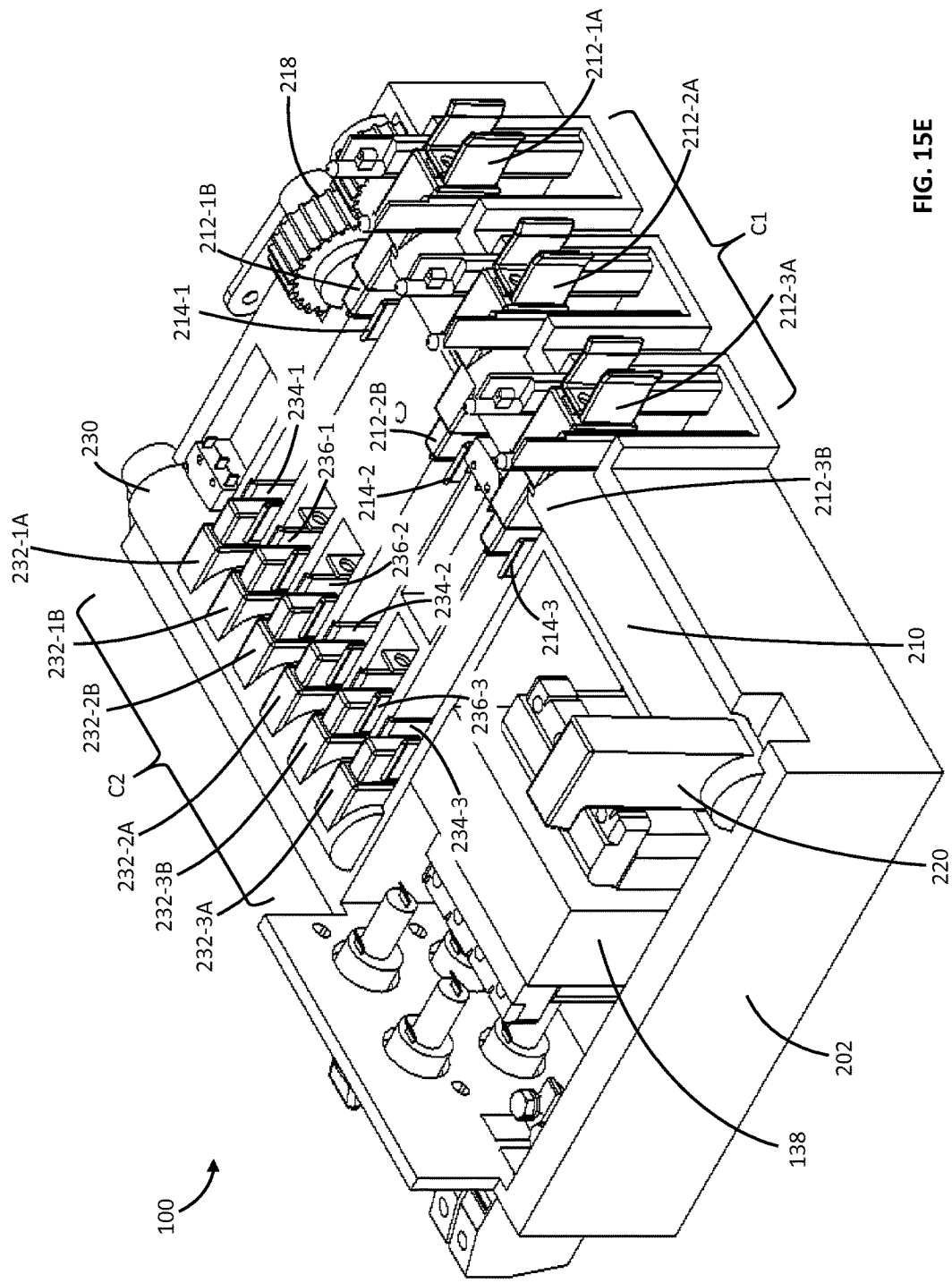
Figure 15F:
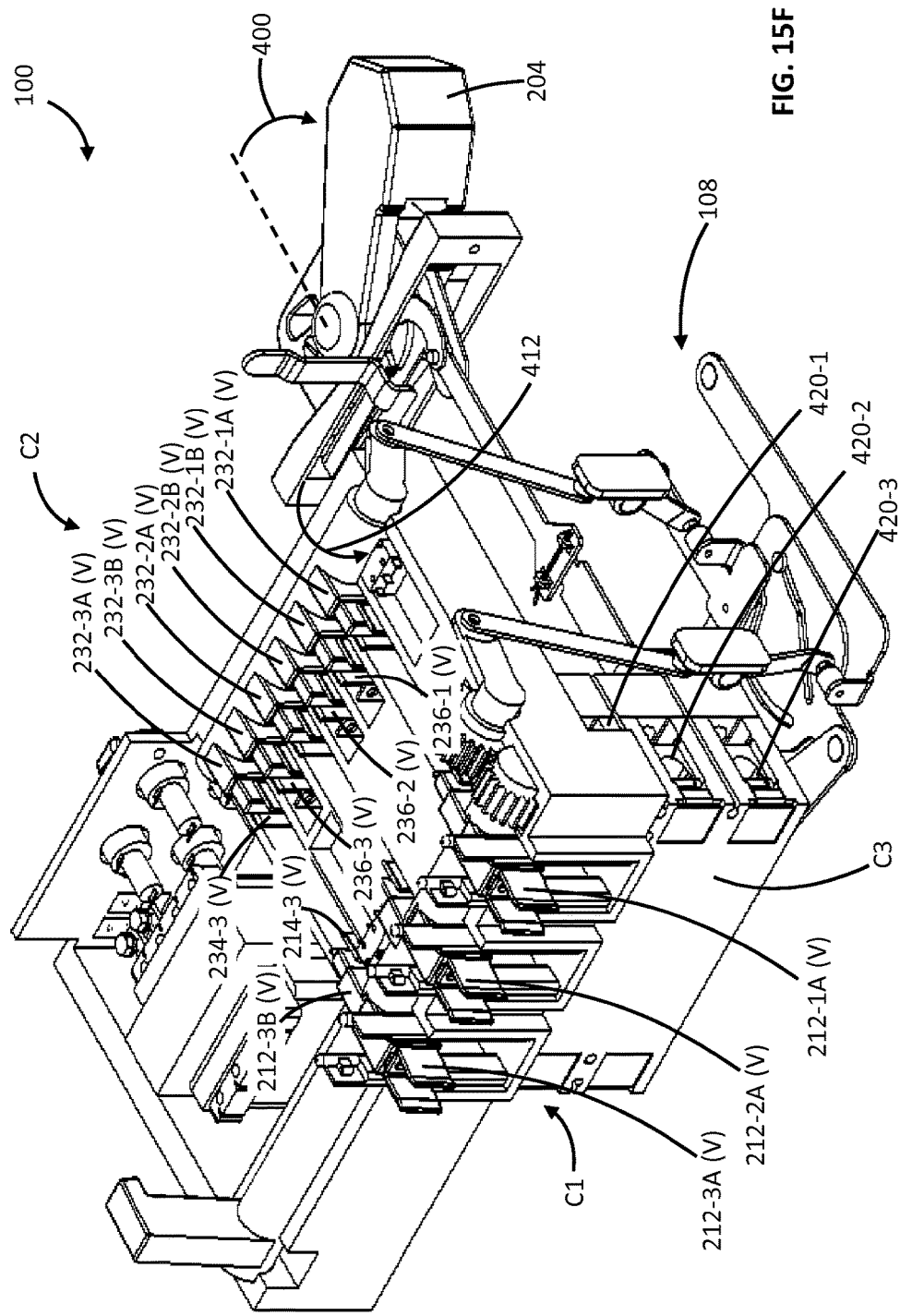
Figure 18A:
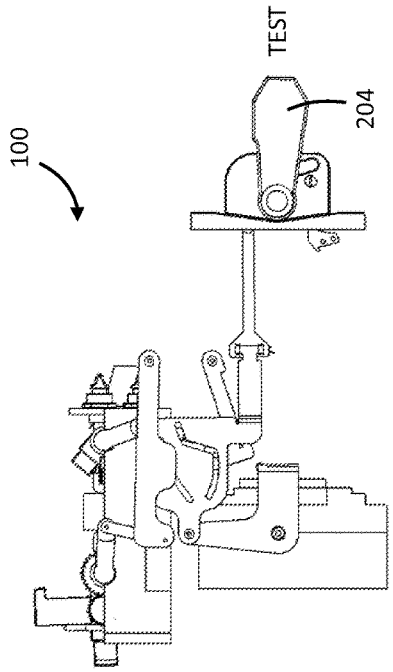
FIGS. 18A to 18D are left-side views of the internals of the control module of FIG. 1A having an operation handle rotatable on a vertical plane between DISCONNECT, TEST, OFF and ON states, respectively, according to an alternative embodiment.
Figure 18B:
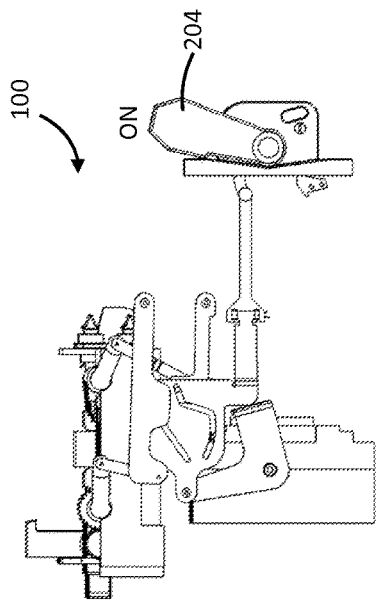
Figure 18C:
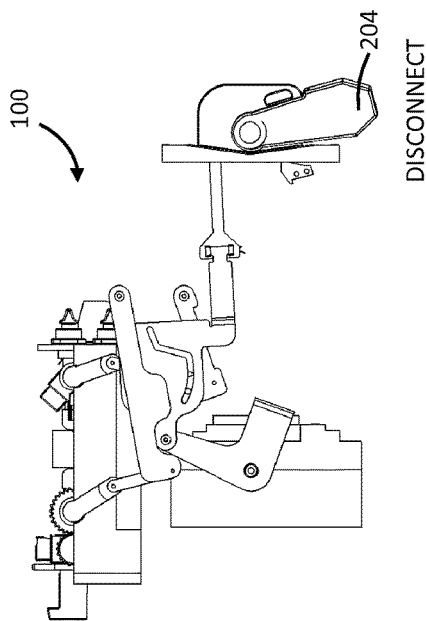
Figure 18D:
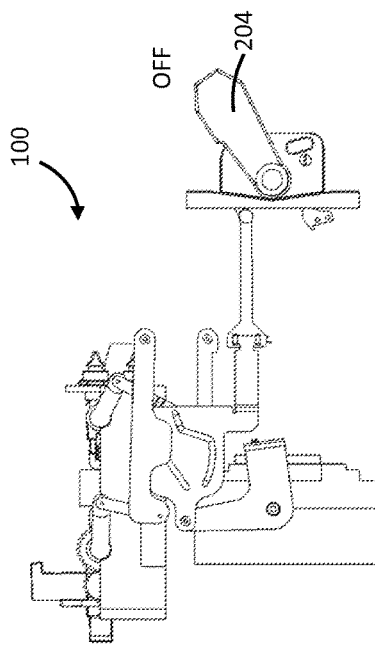

In particular as illustrated in FIG. 15F, one phase of electrical voltage V is conducted from the bus-bar through the first contact 212-3 (i.e., the external prongs 212-3A and internal prongs 213-3B), the electrical terminal 214-3, the receiving terminal 234-3, contact 232-3 (i.e., receiving prong 232-3A, passing prong 232-3B), the passing terminal 236-3 to the output 420-3 of the circuit breaker C3 for outputting electrical power to an external load (not shown). Similarly, the other two phases of electrical voltage V are also conducted from the bus-bar to the outputs 420-1 and 420-2 of the circuit breaker C3 for outputting electrical power to the external load following similar paths. Now, the electricity is supplied to the internal compartment area (for example contactor assembly) of the control module 100 and the external load, thereby traversing the entire electrical circuit of the control module 100.

If the operation handle 204 is shifted from the ON position back to the OFF position, the C3-actuation shaft 332 urges the switching handle 334 of the circuit breaker C3 away from its CLOSED position. The circuit breaker C3 is then switched to the non-conducting state. The control module 100 is then switched back to the OFF state.

Referring to FIG. 16, an isometric view of the control module 100 with a side covering 430 is depicted. The side covering 430 accordingly acts as a part of the cabinet 202 and obscures the internal compartment (the first and second contact sets C1 and C2, the circuit breaker C3, the actuation structure 108, electrical terminals, etc.) of the control module 100.

FIG. 17 illustrates the opposite side view representation of the control module 100 when compared with the representation of FIG. 16 and accordingly displays another side covering 430 that acts as a part of the cabinet 202 of the control module 100. Such side covering 430 has been disposed on the opposite side as compared to FIG. 16.

Although not shown in the above embodiments, those skilled in the art appreciate that the control module 100 may also comprise other electrical components as needed, e.g., contactor assemblies, overload relays, voltage regulators, fuses, and the like.

In the above embodiments, the operation handle 204 is rotatable on a horizontal plane between four positions. In an alternative embodiment shown in FIGS. 18A to 18D, the operation handle 204 may be configured to be rotatable on a vertical plane between the above mentioned four (4) positions, i.e., DISCONNECT, TEST, OFF and ON positions. An actuation structure similar to the actuation structure 108 of the above embodiment is used and shown in FIGS. 18A to 18D for transferring the operation of the vertically rotatable operation handle 204 to that of the first and second contact sets C1 and C2. Those skilled in the art appreciate that in other embodiments, the control module may have a different number of states and the operation handle 204 may be configured to a corresponding number of positions each corresponding to a respective state.

Figure 19:
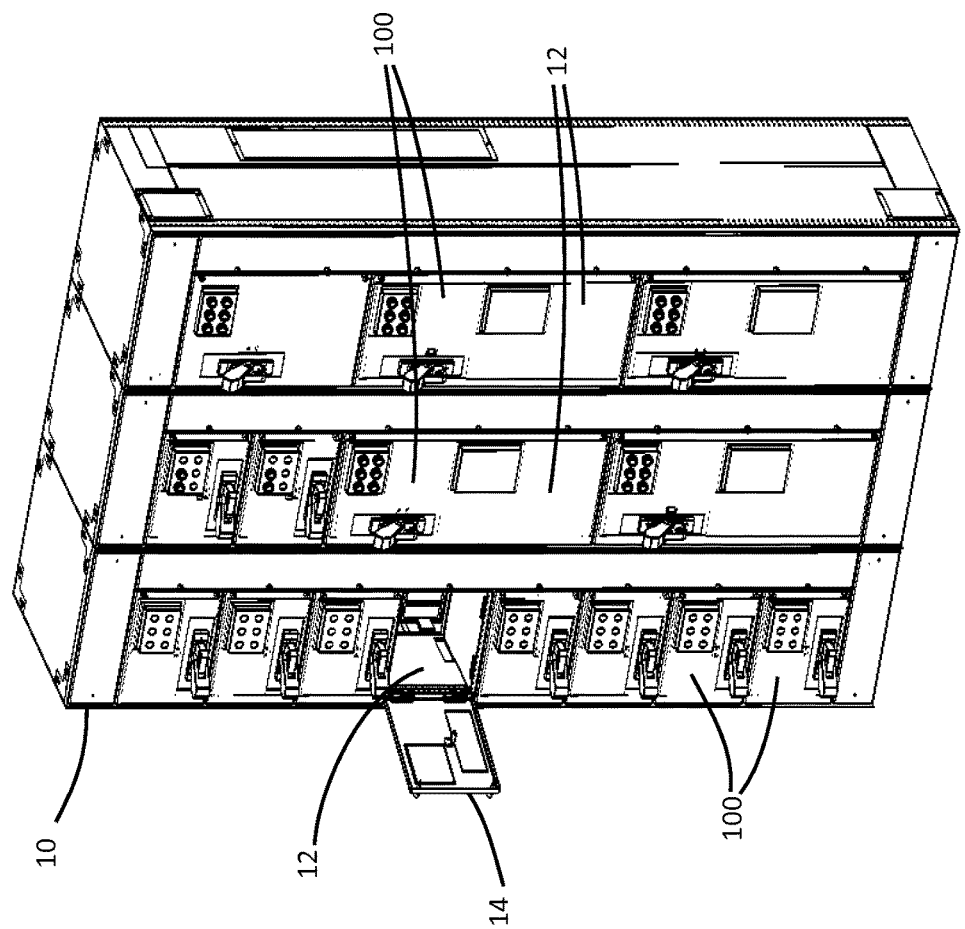
FIG. 19 is an isometric view of a motor control center having a plurality of control modules, according to another embodiment.

In the above embodiments, the motor control center 10 comprises one column of compartments 12 for receiving control modules 100 and/or other suitable components. In other embodiments, the motor control center 10 may comprise a plurality of compartments 12 arranged in multiple columns or other suitable arrangement. For example, FIG. 19 shows a motor control center 10 having multiple columns, as an array, of compartments, some of which receive control modules 100.

In an alternative embodiment, the operation handle 204 is remotely operable. As shown in FIGS. 20A to 20D, the control module 100 further comprises an electrical actuator for rotating the operation handle 204 to different positions, in response to a command initiated from a remote operation controller (not shown). The electrical actuator contains a battery, a forward and reversing electric motor, a wireless receiver for receiving commands from the remote operation controller, and an actuator arm 440 coupled to the operation handle 204. The electric actuator (not shown) is attached to the front of the control module 100 with magnets that are secured in the base thereof. The pending wireless input from the remote operation controller used by an operator will cause the electric motor to move, which drives the actuator arm 440. The actuator arm 440 then moves the operation handle 204 to the operate position indicated by the command received from the remote operation controller.

In some alternative embodiments, the actuation structure 108 may comprise other suitable motion transmitting means, such as connecting rods, shafts, cams, cranks, bell cranks, or a combination thereof, for transmitting the rotary actuating motion from the operation handle 204 to C1, C2 and C3.

Although in above embodiments, the control module 100 is used in a motor control center 12 for supplying electrical power to a motor, in other embodiments, the control module 100 may be used for supplying electrical power to other loads.

Although in above embodiments, the electrical power supply provided from the bus-bar is a three-phase electrical power, in some alternative embodiments, other electrical power, e.g., a single phase AC power, a direct current (DC) power or the like, may be supplied to the control module 100.

In above embodiments, when the first contact set C1 is in the OPEN state, it is disconnected from both the bus-bar 102 and the first intermediate circuit 132. In an alternative embodiment, the first contact set C1 is always connected to the first intermediate circuit 132, and is connected/disconnected to the bus-bar when in the CLOSED/OPEN state. In this embodiment, each contact 212-1, 212-2, or 212-3 may only comprise an external prong 212-1A, 212-2A, or 212-3A, which is always connected to the electrical terminal 214-1, 214-2, or 214-3.

In an alternative embodiment, each contact 232-1, 232-2 or 232-3 of the second contact set C2 may only comprise one prong 232-1A, 232-2A or 232-3A, connectable to electrical terminal 234-1, 234-2 or 234-3 in CLOSED state, and always connected to terminal 236-1, 236-2 or 236-3 (connected to the circuit breaker C3).

Similarly, in another embodiment, each contact 232-1, 232-2 or 232-3 of the second contact set C2 may only comprise one prong 232-1B, 232-2B or 232-3B, connectable to electrical terminal 236-1, 236-2 or 236-3 in CLOSED state, and always connected to the terminal 234-1, 234-2 or 234-3 (connected to terminal 214-1, 214-2, or 214-3).

Those skilled in the art appreciate that each of the first and second contact sets C1 and C2 are generally a set of switches. In above embodiments, the first and second contact sets C1 and C2 are implemented using rotary contacts. In some alternative embodiments, the first and second contact sets C1 and C2 may be implemented using other types of switches.

Those skilled in the art appreciate that a circuit breaker is a particular type of electrical switch. In some alternative embodiments, the circuit breaker C3 in the control module 100 may be replaced with another type of electrical switch.

In above embodiments, the control module 100 comprises three sets of switches, including the first and second contact sets C1 and C2 and the circuit breaker C3, which are sequentially arranged between a power source and a load, and are switched OPEN or CLOSED according to a predefined rule. In some alternative embodiments, the control module 100 may only comprise two sets of switches, e.g., the contact set C1 and the circuit breaker C3, sequentially arranged between a power source and a load, and switched OPEN or CLOSED according to a predefined rule. In some other embodiments, the control module 100 may comprise more than three sets of switches, which are sequentially arranged between a power source and a load, and are switched OPEN or CLOSED according to a predefined rule.

In above embodiments, the C3-actuation shaft 332 is coupled to a distal end 272 of the master actuation shaft 270. In an alternative embodiment, the C3-actuation shaft 332 comprises a pin. Correspondingly, the master actuation shaft 270 further comprises a third J-slot for movably receiving the pin of the C3-actuation shaft 332, and actuating the C3-actuation shaft 332 and switch the circuit breaker C3 OPEN or CLOSED. Similar to the first and second J-slots 274 and 276, the third J-slot also comprises three sections S1, S2 and S3. S1 and S2 of the third J-slot is aligned to the movement direction of the master actuation shaft 270, but S3 of the third J-slot is angled to the movement direction thereof such that the C3-actuation shaft 332 is actuated only when its pin is in section S3 of the third J-slot.

In above embodiment, each pair of doors 226 are swing doors that may be pushed by the external prongs 212-1B, 212-2B or 212-3B to swing outward and open. In an alternative embodiment, each pair of doors 226 are sliding doors that may be actuated by the external prongs 212-1B, 212-2B or 212-3B to slide opposite to each other and open.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. Numerous variations, whether explicitly given in the specification or not, such as differences in structure, dimension, and use of material, are possible. The scope of embodiments is at least as broad as given by the following claims.

What is claimed is:

1. An apparatus for selectively connecting a power source to a load, the apparatus comprising:
    a cabinet;
    a first set of switches enclosed in the cabinet synchronously switchable between an OPEN state and a CLOSED state, each switch of the first set of switches comprising a first prong, wherein when the first set of switches are at the CLOSED state, each first prong extends out of the cabinet for electrically connecting to the power source, and when the first set of switches are at the OPEN state, each first prong is fully retracted into the cabinet;
    a second set of switches enclosed in the cabinet;
    a third set of switches enclosed in the cabinet synchronously switchable between an OPEN state and a CLOSED state, said third set of switches, when at the CLOSED state, electrically connecting the first set of switches to the load via the second set of switches, the second set of switches being electrically connectable between the first and third sets of switches and synchronously switchable between an OPEN state and a CLOSED state; and
    an actuation structure enclosed in the cabinet operably coupled to the first, second, and third sets of switches for switching the first, second, and third sets of switches to transit the apparatus to one of a predefined set of states in response to a user command received from outside of the cabinet;
    wherein the second set of switches is actuatable by the actuation structure to switch to the CLOSED state only when the first set of switches are in the CLOSED state, and the third set of switches is actuatable by the actuation structure to switch to the CLOSED state only when the first and second sets of switches are in the CLOSED state.

2. The apparatus of claim 1 further comprising:
    an operation handle; wherein the actuation structure is coupled between the operation handle and the first, second, and third sets of switches, wherein the operation handle is extendable outside the cabinet, and is operable by a user outside the cabinet for initiating a command to transit the apparatus to one of the predefined set of states.

3. The apparatus of claim 1 wherein the predefined set of states comprises:
    a DISCONNECT state, in which the first, second and third sets of switches are in the OPEN state;
    a TEST state, in which the first set of switches are in the CLOSED state, and the second and third sets of switches are in the OPEN state;
    an OFF state, in which the first and second sets of switches are in the CLOSED state, and the third set of switches are all in the OPEN state; and
    an ON state, in which the first, second and third sets of switches are all the CLOSED state.

4. The apparatus of claim 3 wherein the first set of switches, when in the CLOSED state also connects the power source to a transformer for supplying transformed electrical power to a testing device.

5. The apparatus of claim 4 wherein the first set of switches further comprises a first rotatable cylindrical member, the first prongs of the first set of switches being mounted on the first rotatable cylindrical member and rotatable therewith, the first rotatable cylindrical member coupled to the actuation structure for being actuated to switch the first set of switches between the OPEN and CLOSED states.

6. The apparatus of claim 5 wherein each switch of the first set of switches further comprises a second prong electrically coupled to the first prong thereof; said second prongs being mounted on the first rotatable cylindrical member and rotatable therewith; wherein when the first set of switches are in the CLOSED states, each of the second prongs thereof is electrically connected to a respective first electrical terminal in the cabinet, each of said first electrical terminals connectable to a respective switch of the second set of switches.

7. The apparatus of claim 6 wherein the second set of switches further comprises a second rotatable cylindrical member, the second set of switches being mounted on the second rotatable cylindrical member and rotatable therewith, the second rotatable cylindrical member coupled to the actuation structure for being actuated to switch the second set of switches between the OPEN and CLOSED states.

8. The apparatus of claim 7 wherein each switch of the second set of switches comprises a third prong mounted on the second rotatable cylindrical member and rotatable therewith; wherein when the second set of switches are in the CLOSED states, each of the third prongs thereof is electrically connected to a respective one of the first electrical terminals in the cabinet.

9. The apparatus of claim 8 wherein each switch of the second set of switches further comprises a fourth prong mounted on the second rotatable cylindrical member and rotatable therewith; wherein when the second set of switches are in the CLOSED states, each of the fourth prongs thereof is electrically connected to a respective switch of the third set of switches.

10. The apparatus of claim 9 wherein the actuation structure comprises a shaft movably coupled to the operation handle, the shaft comprising a first and a second J-slots for actuating the first and second rotatable cylindrical members, respectively.

11. The apparatus of claim 10 wherein each of the first and second J-slots comprises a first, a second and a third sections, the first rotatable cylindrical member only being actuated by the first section of the first J-slot, and the second rotatable cylindrical member only being actuated by the second section of the second J-slot.

12. The apparatus of claim 11 wherein the power source comprises a set of bus bars for passing electrical power to the load.

13. The apparatus of claim 12 wherein the power source is a three phase power source and comprises three bus bars, and each of the first, second and third sets of switches comprise three switches.

14. The apparatus of claim 12 wherein the power source is a single phase power source and comprises only one bus bar, and each of the first, second and third sets of switches comprise only one switch.

\* \* \* \* \*